US012703099B2

(12) United States Patent
Wu et al.

(10) Patent No.: US 12,703,099 B2
(45) Date of Patent: Aug. 11, 2026

(54) HAND-EYE CALIBRATION METHODS, SYSTEMS, AND STORAGE MEDIA FOR ROBOTS

(71) Applicant: WUHAN UNITED IMAGING SURGICAL CO., LTD., Wuhan (CN)

(72) Inventors: Tong Wu, Wuhan (CN); Bo Wu, Wuhan (CN); Qiang Xie, Shanghai (CN)

(73) Assignee: WUHAN UNITED IMAGING SURGICAL CO., LTD., Wuhan (CN)

( * ) Notice: Subject to any disclaimer, the term of this patent is extended or adjusted under 35 U.S.C. 154(b) by 264 days.

(21) Appl. No.: 18/427,770

(22) Filed: Jan. 30, 2024

(65) Prior Publication Data

US 2024/0165818 A1 May 23, 2024

Related U.S. Application Data

(63) Continuation of application No. PCT/CN2022/108272, filed on Jul. 27, 2022.

(30) Foreign Application Priority Data

Jul. 30, 2021 (CN) ........................ 202110875108.5

(51) Int. Cl.
*B25J 9/16* (2006.01)

(52) U.S. Cl.
CPC .................................. *B25J 9/1692* (2013.01)

(58) Field of Classification Search
CPC ................. B25J 9/1692; B25J 9/1697; G05B 2219/39045; G05B 2219/39057
See application file for complete search history.

(56) References Cited

U.S. PATENT DOCUMENTS

2003/0130763 A1* 7/2003 Murakami ............. B25J 9/1697
700/259
2014/0244037 A1* 8/2014 Scott .................... G05B 19/409
700/253

(Continued)

FOREIGN PATENT DOCUMENTS

CN 102221409 A 10/2011
CN 104978732 A 10/2015

(Continued)

OTHER PUBLICATIONS

International Search Report in PCT/CN2022/108272 mailed on Sep. 28, 2022, 8 pages.

(Continued)

*Primary Examiner* — Abby Lin
*Assistant Examiner* — Danielle M Jackson
(74) *Attorney, Agent, or Firm* — Poseidon Advanced IP LLC

(57) ABSTRACT

A hand-eye calibration method, apparatus, system, and storage medium for a robot are provided. The method includes: obtaining images of a target body of a calibration target acquired by an imaging device when the robot (110) is in different poses; for any pose, determining, based on at least one image collected in the pose, a first transformation relationship between a first coordinate system of the calibration target and a second coordinate system of the imaging device in the pose; obtaining a second transformation relationship between a third coordinate system and a fourth coordinate system of the robot (110); and determining, based on the first transformation relationships and the second transformation relationships corresponding to the different poses, a third transformation relationship between the second coordinate system and one of the third coordinate (Continued)

system and the fourth coordinate system. Further provided is a calibration target.

20 Claims, 8 Drawing Sheets

(56) References Cited

U.S. PATENT DOCUMENTS

| | | | | |
|---|---|---|---|---|
| 2014/0365007 | A1* | 12/2014 | Trompeter | B25J 9/1692 700/254 |
| 2015/0025683 | A1 | 1/2015 | Amano | |
| 2016/0039096 | A1 | 2/2016 | Wallack et al. | |
| 2016/0042515 | A1 | 2/2016 | Sorgi et al. | |
| 2016/0182903 | A1 | 6/2016 | Grundhöfer | |
| 2017/0227644 | A1* | 8/2017 | Boillot | G01S 17/48 |
| 2018/0126553 | A1* | 5/2018 | Corkum | B25J 9/1697 |
| 2022/0164987 | A1* | 5/2022 | Tao | G06T 7/337 |

FOREIGN PATENT DOCUMENTS

| | | | |
|---|---|---|---|
| CN | 105014667 | A | 11/2015 |
| CN | 204795440 | U | 11/2015 |
| CN | 107590835 | A | 1/2018 |
| CN | 109658460 | A | 4/2019 |
| CN | 109765036 | A | 5/2019 |
| CN | 111062989 | A | 4/2020 |
| CN | 111076677 | A | 4/2020 |
| CN | 111152223 | A | 5/2020 |
| CN | 113601503 | A | 11/2021 |
| EP | 2767370 | A2 | 8/2014 |

OTHER PUBLICATIONS

Written Opinion in PCT/CN2022/108272 mailed on Sep. 28, 2022, 10 pages.

First Office Action in Chinese Application No. 202110875108.5 mailed on Jun. 29, 2022, 20 pages.

Roger Y. Tsai et al., A New Technique for Fully Autonomous and Efficient 3D Robotics Hand/Eye Calibration, IEEE Transactions on Robotics and Automation, 5(3): 345-358, 1989.

Ihtisham Ali et al., Methods for Simultaneous Robot-World-Hand-Eye Calibration: A Comparative Study, Sensors, 19(12): 1-16, 2019.

Lu, Yuting, Research on Robot Calibration Base on Vision, Chinese Master's Theses Full-text Database, 2013, 77 pages.

The Extended European Search Report in European Application No. 22848584.3 mailed on Sep. 25, 2024, 9 pages.

* cited by examiner

Figure 2:
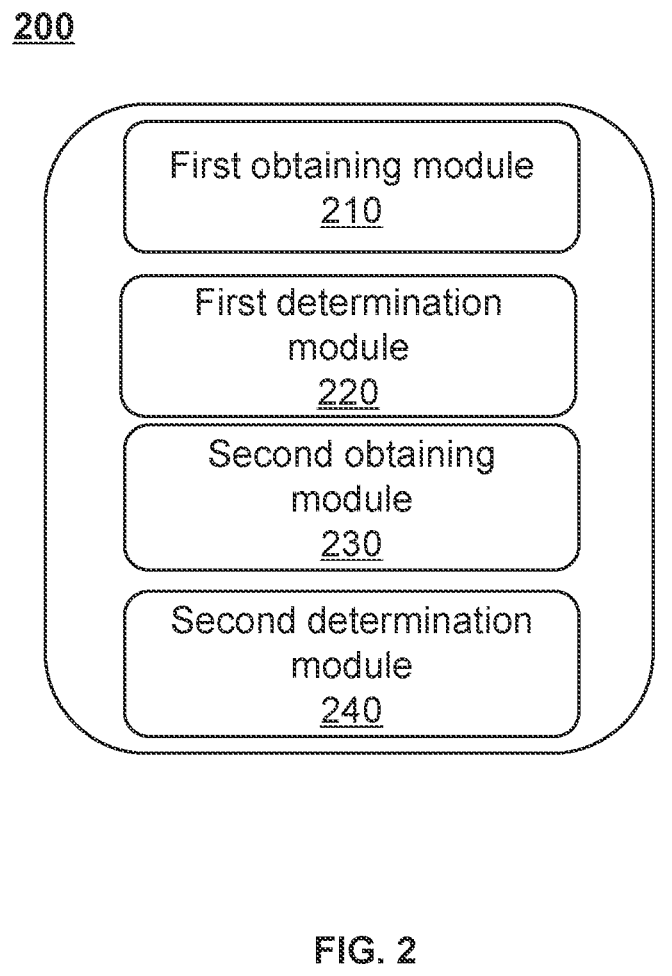

200

First obtaining module 210

First determination module 220

Second obtaining module 230

Second determination module 240

Figure 3:
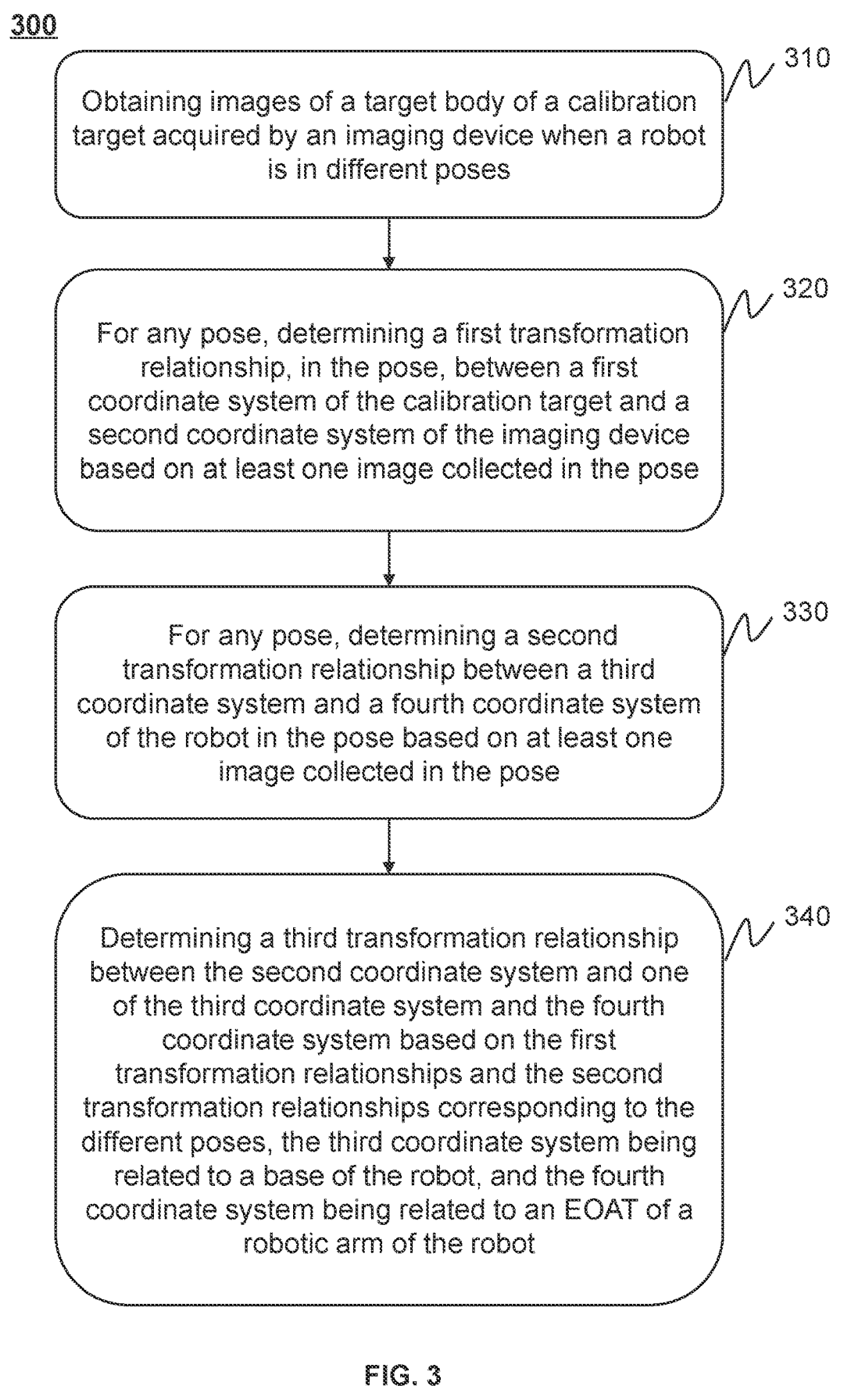

310 Obtaining images of a target body of a calibration target acquired by an imaging device when a robot is in different poses 320 For any pose, determining a first transformation relationship, in the pose, between a first coordinate system of the calibration target and a second coordinate system of the imaging device based on at least one image collected in the pose 330 For any pose, determining a second transformation relationship between a third coordinate system and a fourth coordinate system of the robot in the pose based on at least one image collected in the pose 340 Determining a third transformation relationship between the second coordinate system and one of the third coordinate system and the fourth coordinate system based on the first transformation relationships and the second transformation relationships corresponding to the different poses, the third coordinate system being related to a base of the robot, and the fourth coordinate system being related to an EOAT of a robotic arm of the robot

Figure 7:
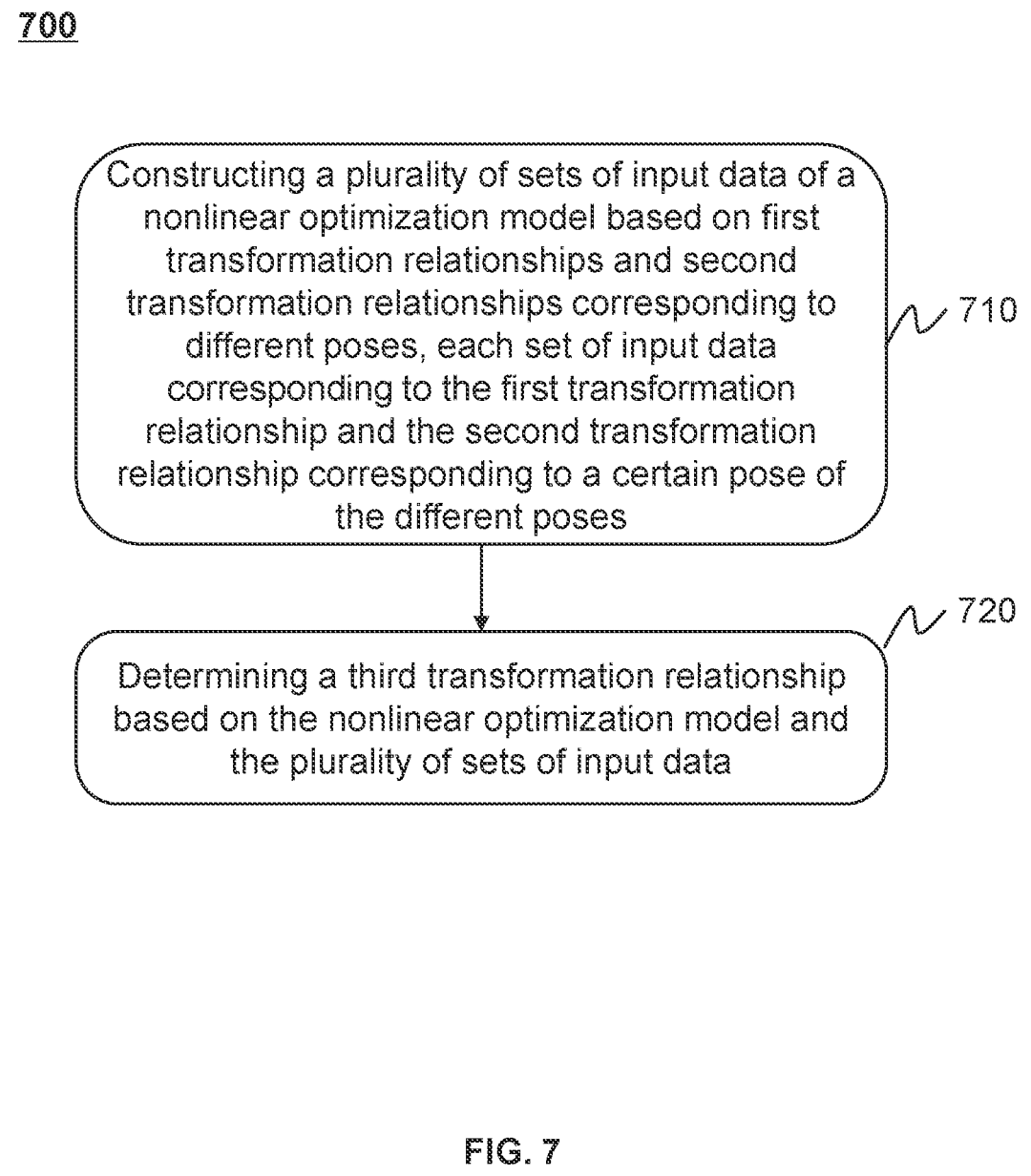

Constructing a plurality of sets of input data of a nonlinear optimization model based on first transformation relationships and second transformation relationships corresponding to different poses, each set of input data corresponding to the first transformation relationship and the second transformation relationship corresponding to a certain pose of the different poses

710

Determining a third transformation relationship based on the nonlinear optimization model and the plurality of sets of input data

HAND-EYE CALIBRATION METHODS, SYSTEMS, AND STORAGE MEDIA FOR ROBOTS

CROSS-REFERENCE TO RELATED APPLICATIONS

This application is a continuation of International Patent Application No. PCT/CN2022/108272, filed on Jul. 27, 2022, which claims priority to Chinese Patent Application No. 202110875108.5, filed on Jul. 30, 2021, entitled "Hand-eye Calibration Methods, Apparatuses, Computer Devices, and Storage Media," the entire contents of each of which are incorporated herein by reference.

TECHNICAL FIELD

The present disclosure relates to the field of robot vision technology, and in particular to a hand-eye calibration method, system, and storage medium for a robot.

BACKGROUND

In the fields such as industrial robots and surgical robots, robots are usually used for high-precision positioning, assembly, puncture, and other operations. In order for the robot to perform operations, a worker needs to calibrate a coordinate transformation between an imaging device of the robot and a robotic arm of the robot, i.e., hand-eye calibration. High-precision hand-eye calibration can improve the safety and accuracy of the operations.

Therefore, it is desirable to provide a hand-eye calibration method, system, and storage medium for a robot to achieve high-precision hand-eye calibration.

SUMMARY

One embodiment of the present disclosure provides a hand-eye calibration method for a robot. The hand-eye calibration method for the robot may comprise the following operations: obtaining images of a target body of a calibration target acquired by an imaging device when the robot is in different poses; for any pose, determining, based on at least one image collected in the pose, a first transformation relationship between a first coordinate system of the calibration target and a second coordinate system of the imaging device in the pose; obtaining a second transformation relationship between a third coordinate system and a fourth coordinate system of the robot; and determining, based on the first transformation relationships and the second transformation relationships corresponding to the different poses, a third transformation relationship between the second coordinate system and one of the third coordinate system and the fourth coordinate system. The third coordinate system may be related to a base of the robot. The fourth coordinate system may be related to an end-of-arm tool (EOAT) of a robotic arm of the robot.

In some embodiments, the calibration target may further include an infrared light emitting component and an infrared light modulating component. The infrared light emitting component may be configured to emit an infrared light to a target body. The infrared light modulating component may be configured to control the infrared light emitting component to emit an infrared light of at least one of a preset waveband or a preset intensity.

In some embodiments, the obtaining images of a target body of a calibration target acquired by an imaging device when the robot is in different poses may include: adjusting parameter information of at least one of the calibration target or the imaging device; and obtaining the at least one image collected in the pose by controlling the imaging device to perform imaging on the calibration target based on the adjusted parameter information.

In some embodiments, the adjusting parameter information of at least one of the calibration target or the imaging device may include: controlling, based on an infrared light waveband that the imaging device is capable of collecting, the infrared light emitting component to emit an infrared light of a corresponding waveband by the infrared light modulating component.

In some embodiments, the adjusting parameter information of at least one of the calibration target or the imaging device may include: controlling, by the infrared light modulating component, the infrared light emitting component to emit an infrared light of a current intensity; obtaining a current image of the target body acquired by the imaging device under the infrared light of the current intensity; determining whether a quality of the current image meets a condition; and in response to a determination that the quality of the current image does not meet the condition, adjusting, by the infrared light modulating component, the current intensity of the infrared light emitted by the infrared light emitting component.

In some embodiments, the determining whether a quality of the current image meets a condition may include: obtaining, based on the current image, feature data of the target body in the current image; obtaining reference feature data corresponding to the feature data of the target body in the current image; and determining, based on the feature data and the reference feature data, whether the quality of the current image meets the condition.

In some embodiments, the determining, based on the feature data and the reference feature data, whether the quality of the current image meets the condition may include: obtaining a reprojection error based on the feature data and the reference feature data; determining whether the reprojection error is greater than a preset threshold; and in response to a determination that the reprojection error is greater than the preset threshold, determining that the quality of the current image does not meet the condition.

In some embodiments, the obtaining a reprojection error based on the feature data and the reference feature data may include: converting, based on intrinsic parameters and extrinsic parameters of the imaging device, the reference feature data to a current image coordinate system to obtain estimated feature data; and determining, based on an error between the estimated feature data and the feature data, the reprojection error.

In some embodiments, the determining, based on the at least one image collected in the pose, a first transformation relationship between a first coordinate system of the calibration target and a second coordinate system of the imaging device in the pose may include: the at least one image includes a plurality of images, a count of the plurality of images being greater than a threshold, for each image of the plurality of images, extracting feature data from each image; determining, based on the feature data, an extrinsic parameter matrix of the imaging device corresponding to each image; and determining the first transformation relationship based on a plurality of extrinsic parameter matrices corresponding to the plurality of images.

In some embodiments, the determining, based on the feature data, an extrinsic parameter matrix of the imaging device corresponding to each image may include: performing a filtering operation on the feature data to obtain filtered feature data; and determining the extrinsic parameter matrix based on the filtered feature data.

In some embodiments, the determining, based on the first transformation relationships and the second transformation relationships corresponding to the different poses, a third transformation relationship between the second coordinate system and one of the third coordinate system and the fourth coordinate system may include: constructing, based on the first transformation relationships and the second transformation relationships corresponding to the different poses, a plurality of sets of input data of a nonlinear optimization model, each set of input data corresponding to the first transformation relationship and the second transformation relationship corresponding to each pose of the different poses; and determining the third transformation relationship based on the nonlinear optimization model and the plurality of sets of input data.

In some embodiments, each set of input data of the plurality of sets of input data may include a first relative transformation and a second relative transformation. The second relative transformation in each set of input data represents a position transformation of the second coordinate system in the pose corresponding to each set of input data relative to a reference pose. The first relative transformation in each set of input data represents a position transformation of the fourth coordinate system in the pose corresponding to each set of input data relative to the reference pose. The first relative transformation may be constructed based on the second transformation relationship. The second relative transformation may be constructed based on the first transformation relationship.

One embodiment of the present disclosure provides a calibration target. The calibration target may comprise a target body, an infrared light emitting component, and an infrared light modulating component. The infrared light emitting component may be configured to emit an infrared light to the target body. The infrared light modulating component may be configured to control the infrared light emitting component to emit an infrared light of at least one of a preset waveband or a preset intensity.

One embodiment of the present disclosure provides a hand-eye calibration system for a robot. The system may comprise a first obtaining module, a first determination module, a second obtaining module, and a second determination module. The first obtaining module may be configured to obtain images of a target body of a calibration target acquired by an imaging device when the robot is in different poses. For any pose, the first determination module may be configured to determine, based on at least one image collected in the pose, a first transformation relationship between a first coordinate system of the calibration target and a second coordinate system of the imaging device in the pose. For any pose, the second obtaining module may be configured to obtain, based on the at least one image collected in the pose, a second transformation relationship between a third coordinate system and a fourth coordinate system of the robot. The second determination module may be configured to determine, based on the first transformation relationships and the second transformation relationships corresponding to the different poses, a third transformation relationship between the second coordinate system and one of the third coordinate system and the fourth coordinate system. The third coordinate system may be related to a base of the robot. The fourth coordinate system may be related to an end-of-arm tool (EOAT) of the robot.

One embodiment of the present disclosure provides a hand-eye calibration device for a robot. The hand-eye calibration device may comprise a processor configured to execute the hand-eye calibration method for the robot.

One embodiment of the present disclosure provides a non-transitory computer-readable storage medium comprising computer instructions. When executed by a computer, the computer instructions may direct the computer to execute the hand-eye calibration method for the robot.

BRIEF DESCRIPTION OF THE DRAWINGS

The present disclosure will be further illustrated by way of exemplary embodiments, which will be described in detail by means of the accompanying drawings. These embodiments are not limiting. In these embodiments, the same numbering indicates the same structure, wherein:

FIG. 2 is a module diagram illustrating an exemplary processing device for hand-eye calibration according to some embodiments of the present disclosure;

FIG. 3 is a flowchart illustrating an exemplary process of hand-eye calibration according to some embodiments of the present disclosure;

FIG. 7 is a flowchart illustrating an exemplary process of determining a third transformation relationship according to some embodiments of the present disclosure.

DETAILED DESCRIPTION

Figure 1:
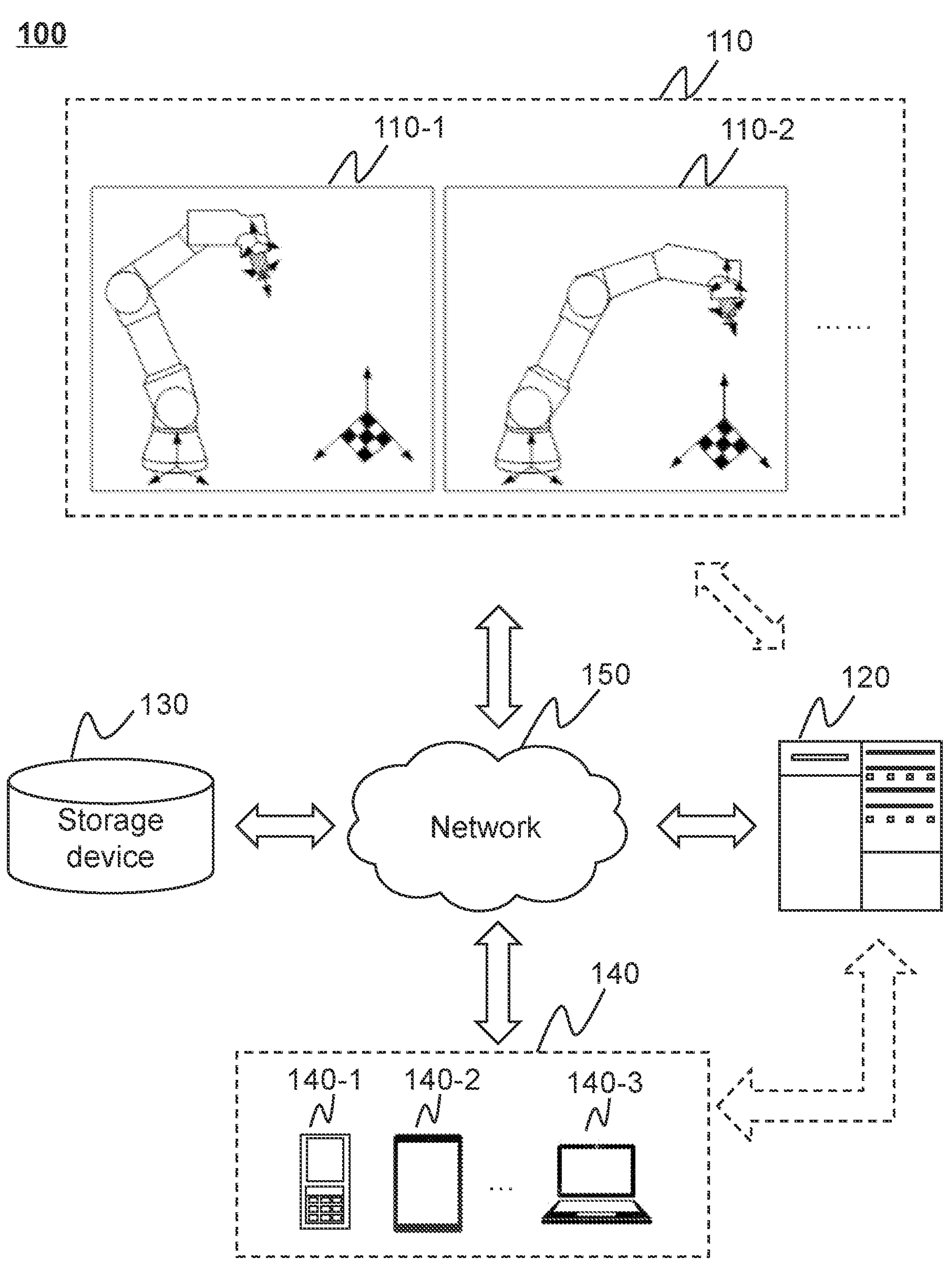
FIG. 1 is a schematic diagram illustrating an application scenario of a hand-eye calibration system according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system," "device," "unit" and/or "module" as used herein is a method for distinguishing different components, elements, parts, portions, or assemblies of different levels. However, the words may be replaced by other expressions if other words can achieve the same purpose.

As indicated in the disclosure and claims, the terms "a," "an," and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

Hand-eye calibration is a relatively basic and important task of a robot vision system. Hand-eye calibration refers to a process of determining a position transformation relationship between a robot and a vision system, thereby unifying the robot and an imaging device to a standard coordinate system. Hand-eye calibration may also be understood as a process of determining a transformation relationship between a coordinate system of the imaging device and a coordinate system of a base of the robot or a robotic arm (e.g., an end tool installed on the robotic arm) of the robot. Hand-eye calibration may be mainly used for robot positioning, robot grabbing, moving, or performing other specific actions. The accuracy of hand-eye calibration may directly affect the development of subsequent operations.

In order to solve the problem of how to improve the accuracy of hand-eye calibration, a calibration target equipped with an infrared light modulating component and an infrared light emitting component can be utilized to adjust parameter information of the calibration target and/or the imaging device to improve qualities of images acquired by the imaging device, thereby improving the collection accuracy of feature data used to determine an extrinsic parameter matrix (i.e., the first transformation relationship) of the imaging device. In addition, a filtering operation may be performed on the collected high-precision feature data to further improve the accuracy of the extrinsic parameter matrix of the imaging device. Furthermore, the calibration accuracy may be further improved by introducing a nonlinear optimization algorithm to a calculation process of hand-eye calibration.

FIG. 1 is a schematic diagram illustrating an application scenario of a hand-eye calibration system according to some embodiments of the present disclosure. In some embodiments, the application scenario 100 of the hand-eye calibration system may include a robot 110, a processing device 120, a storage device 130, a terminal 140, a network 150, and a calibration target.

The robot 110 may be used for hand-eye calibration. The robot 110 may serve as an actuator that can replace and/or assist a human being in performing a specific task or action. For example, the robot 110 may be a surgical robot and may be configured to perform actions such as cutting, hemostasis, suturing, etc. In some embodiments, the robot may include a base, a robotic arm, an end-of-arm tool (EOAT) of the robotic arm, and an imaging device. The imaging device may be called the “eye” of the robot, and the robotic arm may be called the “hand” of the robot. In some embodiments, the robotic arm may include a four-degree-of-freedom (4-DOF) robotic arm, a 6-DOF robotic arm, a 7-DOF robotic arm, etc. In some embodiments, a pose of the robot 110 may include a first pose 110-1 of the robot, a second pose 110-2 of the robot, etc.

In some embodiments, the imaging device may include a structured light camera, a depth camera, a laser camera, etc. In some embodiments, the imaging device may be the structured light camera capable of collecting an infrared light of a certain waveband, such as a waveband of 800 nm-1000 nm, 700 nm-1200 nm, etc. In some embodiments, the imaging device of the robot 110 may be fixed at a fixed position, i.e., eye-to-hand. In some embodiments, the imaging device of the robot 110 may be fixed on the EOAT of the robotic arm, i.e., eye-in-hand.

In some embodiments, the calibration target (not shown in FIG. 1) may include a target body, an infrared light emitting component, and an infrared light modulating component. The infrared light emitting component may be configured to emit an infrared light to the target body. The infrared light modulating component may be configured to control the infrared light emitting component to emit an infrared light of at least one of a preset waveband or a preset intensity. In some embodiments, when hand-eye calibration is performed on an eye-to-hand robot, the calibration target may be fixed on the EOAT of the robotic arm. When hand-eye calibration is performed on an eye-in-hand robot, the calibration target may be fixed at a fixed position. For example, as illustrated in FIG. 1, the robot 110 may be the eye-in-hand robot, and the calibration target may be fixed at a fixed position. More descriptions regarding the calibration target may be found in the detailed descriptions in FIG. 4.

In some embodiments, the robot may include a robot operating system (ROS). The ROS may synchronously transmit data from the robotic arm and the imaging device. In some embodiments, the ROS may preset several sets of pose information of the robotic arm and joint coordinate system information of the robot corresponding to different preset poses. During a hand-eye calibration process, motion control of the robotic arm may be completed using the ROS. For example, the ROS may control the robotic arm to move to one of the preset poses based on the preset pose information, and obtain an image of the target body acquired by the imaging device after the ROS system is stabilized. In some embodiments, the processing device 120 may obtain images of a target body (also referred to as target body images) acquired by the imaging device and/or the joint coordinate system information of each rotating joint of the robotic arm from the ROS.

The processing device 120 may be configured to process data related to hand-eye calibration. For example, the processing device 120 may obtain target body images of the calibration target acquired by the imaging device when the robot is in different poses. Further, for any pose, the processing device 120 may determine a first transformation relationship between a first coordinate system of the calibration target and a second coordinate system of the imaging device in the pose based on the target body image collected in the pose, and obtain a second transformation relationship between a third coordinate system and a fourth coordinate system of the robot. The processing devices 120 may determine a third transformation relationship between the second coordinate system and the third coordinate system, or between the second coordinate system and the fourth coordinate system based on the first transformation relationships and the second transformation relationships corresponding to the different poses. The third coordinate system may be related to a base of the robot. The fourth coordinate system may be related to the EOAT of the robotic arm of the robot.

In some embodiments, the processing device 120 may be a single server or server groups. The server groups may be centralized or distributed. In some embodiments, the processing device 120 may be local or remote. In some embodiments, the processing device 120 may be implemented on a cloud platform. Merely by way of example, the cloud platform may include a private cloud, a public cloud, a hybrid cloud, a community cloud, a distributed cloud, an internal cloud, a multi-tier cloud, or the like, or any combination thereof. In some embodiments, the processing device 120 may be integrated or installed on the robot 110. For example, the processing device 120 may be fixed on the robot. In some embodiments, the processing device 120 may be integrated or installed on the imaging device.

The storage device 130 may store data, instructions, and/or any other information. In some embodiments, the storage device may store data and/or instructions related to hand-eye calibration. For example, the storage device may store data obtained and generated during the hand-eye calibration process, such as the images, the first transformation relationships, and the second transformation relationships. As another example, the storage device may store instructions for processing the first transformation relationships and the second transformation relationships to determine the third transformation relationship.

In some embodiments, the storage device 130 may be connected with the network 150 to communicate with one or more other components (e.g., the robot 110, the processing device 120, the terminal 140, etc.) of the application scenario 100 of the hand-eye calibration system. The one or more components of the application scenario 100 of the hand-eye calibration system may access the data or the instructions stored in the storage device 130 through the network 150. In some embodiments, the storage device 130 may be a part of the processing device 120.

The terminal 140 may include a mobile device 140-1, a tablet computer 140-2, a notebook computer 140-3, or the like, or any combination thereof. In some embodiments, the terminal 140 may be a part of the processing device 120.

In some embodiments, the terminal 140 may send and/or receive information related to hand-eye calibration to/from the processing device 120 via a user interface. In some embodiments, the user interface may be in the form of an application for hand-eye calibration implemented on the terminal 140. The user interface may be configured to facilitate communication between the terminal 140 and users associated with the terminal 140. In some embodiments, the user interface may receive an input from a user requesting to perform hand-eye calibration through the user interface (e.g., a user interface screen). The terminal 140 may send a request for performing the hand-eye calibration to the processing device 120 via the user interface to obtain the third transformation relationship.

The network 150 may include any suitable network that facilitates information and/or data exchange for the application scenario 100 of the hand-eye calibration system. In some embodiments, the one or more components of the robot 110, the processing device 120, the storage device 130, the terminal 140, or the like, may communicate the information and/or data with the one or more other components of the application scenario 100 of the hand-eye calibration system via the network 150.

FIG. 2 is a module diagram illustrating an exemplary processing device for hand-eye calibration according to some embodiments of the present disclosure. A processing device 200 may be a specific embodiment of the processing device 120 illustrated in FIG. 1.

In some embodiments, the processing device 200 may include a first obtaining module 210, a first determination module 220, a second obtaining module 230, and a second determination module 240.

The first obtaining module 210 may be configured to obtain target body images of a calibration target acquired by an imaging device when a robot is in different poses. In some embodiments, the calibration target may further include an infrared light emitting component and an infrared light modulating component. The infrared light emitting component may be configured to emit an infrared light to a target body. The infrared light modulating component may be configured to control the infrared light emitting component to emit an infrared light of at least one of a preset waveband or a preset intensity. In some embodiments, the first obtaining module 210 may be further configured to adjust parameter information of at least one of the calibration target or the imaging device, and control the imaging device to perform imaging on the target body based on the adjusted parameter information to obtain the target body image collected in the pose.

For any pose, the first determination module 220 may be configured to determine, based on the target body image collected in the pose, a first transformation relationship between a first coordinate system of the calibration target and a second coordinate system of the imaging device in the pose. In some embodiments, a count of target body images may be greater than a threshold. The first determination module 220 may be further configured to extract feature data from each of the target body images; determine, based on the feature data, an extrinsic parameter matrix of the imaging device corresponding to each of the target body images; and determine the first transformation relationship based on a plurality of extrinsic parameter matrices corresponding to the target body images.

For any pose, the second obtaining module 230 may be configured to obtain, based on the target body image collected in the pose, a second transformation relationship between a third coordinate system and a fourth coordinate system of the robot in the pose.

The second determination module 240 may be configured to determine, based on the first transformation relationships and the second transformation relationships corresponding to the different poses, a third transformation relationship between the second coordinate system and one of the third coordinate system and the fourth coordinate system. The third coordinate system may be related to a base of the robot. The fourth coordinate system may be related to an EOAT of a robotic arm of the robot. In some embodiments, the second determination module 240 may be further configured to construct, based on the first transformation relationships and the second transformation relationships corresponding to the different poses, a plurality of sets of input data of a nonlinear optimization model, each set of input data corresponding to the first transformation relationship and the second transformation relationship corresponding to each pose of the different poses; and determine the third transformation relationship based on the nonlinear optimization model and the plurality of sets of input data.

More descriptions regarding the first obtaining module 210, the first determination module 220, the second obtaining module 230, and the second determination module 240 may be found in FIGS. 3-7 and related descriptions thereof.

It should be understood that the system and modules thereof illustrated in FIG. 2 may be implemented in various ways. It should be noted that the above description of the obtaining and determination system and modules thereof is only for the convenience of description and does not limit the present disclosure to the scope of the embodiments. It can be understood that for those skilled in the art, after understanding the principle of the system, it is possible to arbitrarily combine various modules or form a subsystem to connect with other modules without departing from this principle. In some embodiments, the first obtaining module, the first determination module, the second obtaining module, and the second determination module disclosed in FIG. 2 may be different modules of a system, or one module that implements functions of the above two or more than two modules. For example, each module may share a storage module, or each module may have its own storage module. Such variations are within the scope of the present disclosure.

FIG. 3 is a flowchart illustrating an exemplary process of hand-eye calibration according to some embodiments of the present disclosure. As illustrated in FIG. 3, a process 300 may include the following operations. In some embodiments, one or more operations of the process 300 illustrated in FIG. 3 may be implemented in the application scenario 100 of the hand-eye calibration system illustrated in FIG. 1. For example, the process 300 illustrated in FIG. 3 may be stored in the storage device 130 in the form of instructions and called and/or executed by the processing device 120.

In 310, images of a target body (also referred to as target body images) of a calibration target acquired by an imaging device when a robot is in different poses may be obtained. In some embodiments, operation 310 may be performed by the first obtaining module 210.

A pose refers to a posture produced by joints of the robot's robotic arm at different angles and a position of the robotic arm (e.g., an EOAT of the robotic arm) when in that posture. In some embodiments, as illustrated in FIG. 1, joint angles of the robotic arm in the first pose 110-1 of the robot and the second pose 110-2 of the robot may be different, and the robots are corresponding robots in different poses. More descriptions regarding the robot may be found elsewhere in the present disclosure (e.g., FIG. 1).

A target body image refers to an image obtained by photographing the calibration target by the imaging device of the robot. For any pose, the imaging device may collect one or more target body images. In some embodiments, for any pose, a count of the target body images acquired by the imaging device may be greater than a certain threshold. For example, the threshold of the count of the target body images acquired by the imaging device may be 100, 50, 20, 10, etc. In some embodiments, the count of the target body images obtained in different poses may be different. In some embodiments, the count of the target body images obtained in different poses may be the same.

In some embodiments, in order to collect a target body image using the imaging device when the robot is in a certain pose, the processing device 120 may adjust parameter information of at least one of the calibration target or the imaging device, and control the imaging device to perform imaging on the calibration target based on the adjusted parameter information when the robot is in the certain pose to obtain the target body image collected in the pose.

In some embodiments, the calibration target may include a target body. The target body may be an object capable of providing a geometric constraint (e.g., having a specific shape, pattern, size, color, etc.). For example, the calibration target may be a sawtooth block, a mutually perpendicular plane target, a standard mass block, a standard ball, a checkerboard, a circular array target, a plane parallel line target, a unit ring, a one-dimensional target, a linear scale, etc. Structural feature information of the target body may be stored in a storage device (e.g., the storage device 130) in advance. In some embodiments, the structural feature information of the target body may include position information (e.g., a position in a calibration target coordinate system), size information, etc., of points, lines, regions, etc., with obvious features (e.g., different colors, sizes, etc.) on the target body. In some embodiments, the target body may include regions with different colors (e.g., black and white, black and red, purple and white, etc.). For example, the target body may be a checkerboard pattern composed of black and white grids, or 9 black circles evenly distributed in the form of 3 rows×3 columns on a white background image. Positions and sizes of the black and white grids, black dots and other features of the calibration target are all known.

In some embodiments, the calibration target may further include an infrared light emitting component and an infrared light modulating component. The infrared light emitting component may be provided inside the target body. The infrared light emitting component may emit an infrared light to the target body. Different regions of the target body may have different transmittances to the infrared light emitted by the infrared light emitting component. For example, a black region may have a weak transmittance to the infrared light, while a white region may have a strong transmittance to the infrared light. Under the same irradiation, the black region may have a weak light transmission, while the white region may have a strong light transmission, thereby distinguishing different color regions of the target body. The infrared light emitting component may be connected with the infrared light modulating component, so that the infrared light modulating component may control the infrared light emitting component to emit an infrared light of at least one of a preset waveband or a preset intensity.

Figure 4:
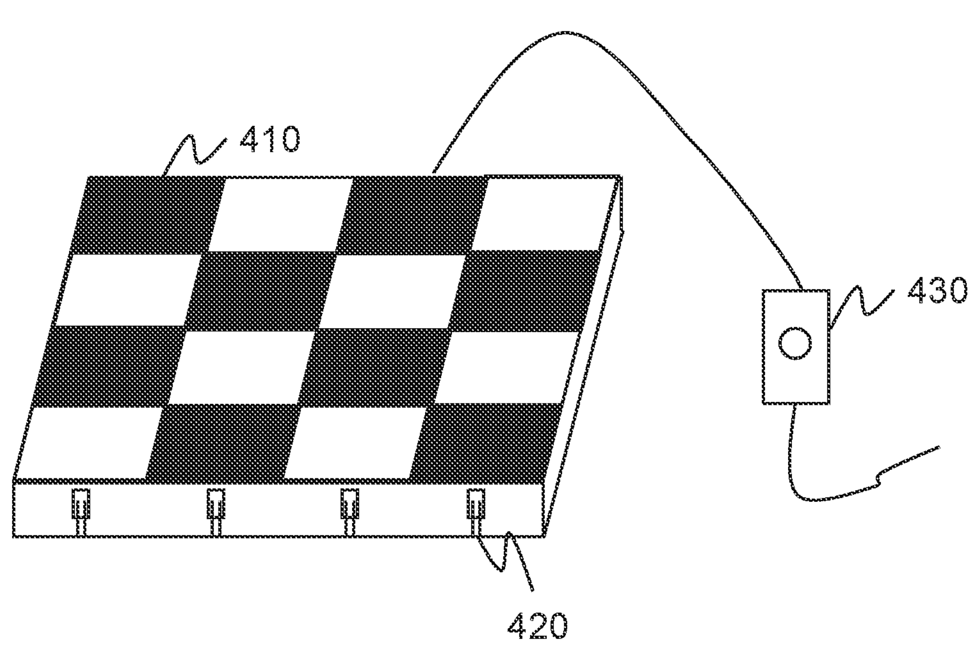
FIG. 4 is a schematic diagram illustrating a calibration target according to some embodiments of the present disclosure.

As illustrated in FIG. 4, a calibration target 400 may include a target body 410, an infrared light emitting component 420, and an infrared light modulating component 430. The infrared light emitting component 420 may be configured to emit an infrared light to the target body 410. The infrared light modulating component 430 may be configured to control the infrared light emitting component 420 to emit an infrared light of at least one of a preset waveband or a preset intensity.

The infrared light emitting component 420 may be provided inside the target body 410. The infrared light emitting component 420 may be connected with the infrared light modulating component 430. More descriptions regarding the calibration target may be found in the detailed descriptions in FIG. 4.

The parameter information of the calibration target may include a waveband and/or an intensity of the infrared light emitted by the calibration target. In some embodiments, the parameter information of the calibration target may be different in different poses. In some embodiments, the parameter information of the calibration target may be the same in the different poses.

The parameter information of the imaging device refers to a distance, an angle, or other information between the imaging device and the calibration target. In some embodiments, the distance refers to a distance between an origin of an imaging device coordinate system and an origin of a calibration target coordinate system. The angle refers to a rotation angle (e.g., an Euler angle) between the imaging device coordinate system and the calibration target coordinate system.

In some embodiments, the processing device 120 may control, based on an infrared light waveband that the imaging device is capable of collecting, the infrared light emitting component to emit an infrared light of a corresponding waveband by the infrared light modulating component. In some embodiments, the imaging device, such as a structured light camera, may only collect an infrared light of a specific waveband, and the calibration target may emit the infrared light of the specific waveband. In this case, other unnecessary light sources may be filtered out. For example, if infrared lights emitted by objects around the calibration target are not within a collection waveband of the imaging device, the calibration target images acquired by the imaging device may not include the objects around the calibration target, thereby reducing interference in image processing analysis (e.g., feature data extraction), and improving data quality. In some embodiments, the processing device 120 may slightly adjust the waveband of the infrared light emitted by the infrared light emitting component in different poses to obtain a better quality of image collection.

In some embodiments, the processing device 120 may adjust a current intensity of the infrared light emitted by the infrared light emitting component. In some embodiments, the processing device 120 may control, by the infrared light modulating component, the infrared light emitting component to emit the infrared light of the current intensity, obtain a current image of the target body acquired by the imaging device under the infrared light of the current intensity, and determine whether a quality of the current image meets a condition. In response to a determination that the quality of the current image does not meet the condition, the processing device 120 may adjust, by the infrared light modulating component, the current intensity of the infrared light emitted by the infrared light emitting component, and then collect the current image of the target body until the quality of the collected image meets the condition. More descriptions regarding adjusting the current intensity of the infrared light emitted by the infrared light emitting component may be found in FIG. 5 and related descriptions thereof.

In some embodiments, the processing device 120 may adjust the distance, the angle, etc., between the imaging device and the calibration target to be within a preset threshold range. The preset threshold range may be set to ensure the quality of image collection, and the preset threshold range of the distance and the angle between the imaging device and the calibration target may be set based on experience. In some embodiments, the processing device 120 may control the distance between the imaging device and the calibration target to be a current distance and the angle between the imaging device and the calibration target to be a current angle, obtain the current image of the target body acquired by the imaging device at the current distance and the current angle, and determine whether the quality of the current image meets the condition. In response to a determination that the quality of the current image does not meet the condition, the processing device 120 may adjust the distance and the angle between the imaging device and the calibration target, and then collect the current image of the target body until the collected image meets the condition.

In some embodiments, the processing device 120 may first adjust the distance and the angle between the imaging device and the calibration target. When the distance and the angle between the imaging device and the calibration target are determined, the pose of the robot may also be determined. The processing device 120 may further adjust the waveband and/or the current intensity of the infrared light emitted by the infrared light emitting component to obtain a better quality of image collection.

In 320, for any pose, a first transformation relationship between a first coordinate system of the calibration target and a second coordinate system of the imaging device in the pose may be determined based on the target body image collected in the pose. In some embodiments, operation 320 may be performed by the first determination module 220.

The first coordinate system refers to a coordinate system associated with the calibration target. When hand-eye calibration is performed on an eye-to-hand robot, the calibration target may be fixed on an EOAT of a robotic arm, and the first coordinate system may move with the movement of the calibration target. The first coordinate system and the calibration target may move synchronously and may be bound to each other. When hand-eye calibration is performed on an eye-in-hand robot, the calibration target may be fixed at a fixed position, and the first coordinate system may be fixed. An origin of the first coordinate system may be determined based on a relative position of the calibration target. For example, the origin of the first coordinate system may be the center, the upper left corner, the upper right corner, the lower left corner, or the lower right corner of the calibration target.

The second coordinate system refers to a coordinate system associated with the imaging device. When hand-eye calibration is performed on the eye-in-hand robot, the imaging device may be fixed on the EOAT of the robotic arm, and the second coordinate system may move with the movement of the imaging device. The second coordinate system and the imaging device may move synchronously and may be bound to each other. When hand-eye calibration is performed on the eye-to-hand robot, the imaging device may be fixed at the fixed position and the second coordinate system may be fixed. An origin of the second coordinate system may be determined based on a relative position of the imaging device. For example, the origin of the second coordinate system may be a position of an optical center of a lens of the imaging device.

The first transformation relationship refers to a transformation relationship between the first coordinate system of the calibration target and the second coordinate system of the imaging device. The first transformation relationship may be related to positions of the calibration target and the imaging device. The first transformation relationship may change with the movement of the calibration target or the imaging device.

In some embodiments, for any pose, the processing device may determine, based on the target body image collected in the pose, the first transformation relationship between the first coordinate system of the calibration target and the second coordinate system of the imaging device in the pose.

In some embodiments, a count of target body images acquired by the imaging device in a certain pose may be one. The processing device 120 may extract feature data from the target body image and determine the first transformation relationship of the imaging device based on the feature data. For example, the processing device 120 may obtain reference feature data in the first coordinate system of the calibration target corresponding to the feature data extracted from the target body image. The processing device 120 may determine the first transformation relationship based on the feature data extracted from the target body image and the reference feature data using algorithms such as a perspective-n-point (PNP) algorithm, a bundle adjustment (BA) algorithm, etc. The PNP algorithm may include a perspective-n-point (P3P) algorithm, a direct linear transform (DLT) algorithm, etc.

In some embodiments, the count of target body images acquired by the imaging device in the certain pose may be multiple. For each of a plurality of target body images, the processing device 120 may extract feature data from each of the plurality of target body images, and determine a first transformation relationship (e.g., an extrinsic parameter matrix) of the imaging device corresponding to each of the plurality of target body images based on the feature data; and determine a final first transformation relationship based on a plurality of first transformation relationships corresponding to the target body mages. More descriptions regarding determining the first transformation relationship may be found in FIG. 6 and related descriptions thereof.

In 330, for any pose, a second transformation relationship between a third coordinate system and a fourth coordinate system of the robot in the pose may be determined based on the target body image collected in the pose. In some embodiments, operation 330 may be performed by the second obtaining module 230.

The third coordinate system may be related to a fixed part of the robot. When the robot performs an action or changes a pose, a position of the third coordinate system (e.g., an origin and coordinate axes of the third coordinate system) may remain unchanged. In some embodiments, the third coordinate system may be a coordinate system associated with a base of the robot. During the action of the robotic arm of the robot, the base may be stationary relative to the robotic arm, and the third coordinate system may be fixed. In some embodiments, the origin of the third coordinate system may be determined based on a relative position of the base of the robot. For example, the origin may be a centroid, a bottom center, etc., of the base of the robot.

The fourth coordinate system may be related to a certain movable position of the robot. When the robot performs an action or changes a pose, a position of the fourth coordinate system (e.g., an origin and coordinate axes of the fourth coordinate system) may change as the pose changes. In some embodiments, the fourth coordinate system may be associated with the robotic arm (e.g., the EOAT of the robotic arm). Since the robotic arm of the robot constantly moves, the fourth coordinate system and the robotic arm of the robot may move synchronously and may be bound to each other. In some embodiments, the origin of the fourth coordinate system may be determined based on a relative position of the EOAT of the robotic arm of the robot. For example, the origin may be a center position of the EOAT of the robotic arm of the robot.

The second transformation relationship refers to a transformation relationship between the third coordinate system and the fourth coordinate system. In some embodiments, the second transformation relationship may be related to the position of the fourth coordinate system. The second transformation relationship may change with the movement of the EOAT of the robotic arm of the robot.

In some embodiments, the robotic arm may include rotating joints and connecting rods. Each rotating joint may correspond to a joint coordinate system. The ROS may synchronously transmit the joint coordinate system of each rotating joint of the robotic arm to the processing device 120. The processing device 120 may determine the second transformation relationship based on the joint coordinate system of each rotating joint of the robotic arm.

In 340, a third transformation relationship between the second coordinate system and one of the third coordinate system and the fourth coordinate system may be determined based on the first transformation relationships and second transformation relationships corresponding to the different poses. In some embodiments, operation 340 may be performed by the second determination module 240.

When hand-eye calibration is performed on the eye-in-hand robot, the third transformation relationship refers to a transformation relationship between the second coordinate system and the fourth coordinate system. When hand-eye calibration is performed on the eye-to-hand robot, the third transformation relationship refers to a transformation relationship between the second coordinate system and the third coordinate system.

The first transformation relationship and the second transformation relationship corresponding to the same pose may constitute one set of data. The first transformation relationships and the second transformation relationships corresponding to the different poses may constitute a plurality of sets of data. The processing device 120 may determine the third transformation relationship (e.g., a hand-eye calibration matrix) based on a hand-eye calibration model based on the plurality of sets of data. For example, the processing device 120 may determine the third transformation relationship using a nonlinear optimization algorithm, a singular value decomposition (SVD) algorithm, a deep learning model, etc.

In some embodiments, the processing device 120 may construct a plurality of sets of input data of a nonlinear optimization model based on the first transformation relationships and the second transformation relationships corresponding to the different poses. For example, the processing device 120 may construct the nonlinear optimization model based on the hand-eye calibration model, and construct input data of the nonlinear optimization model based on the plurality of sets of data. Each set of input data may correspond to the first transformation relationship and the second transformation relationship in each of the different poses, and the third transformation relationship may be determined based on the nonlinear optimization model and the plurality of sets of input data. More descriptions regarding determining the third transformation relationship may be found in FIG. 7 and related descriptions thereof.

The third transformation relationship may be configured to control the robotic arm based on the target body images acquired by the imaging device. For example, before the EOAT of the robot performs an action, the processing device 120 may obtain a target (e.g., a region to be operated on) image acquired by the imaging device. The processing device 120 may obtain a position of a target in the target image, and convert, based on the third transformation relationship, the position of the target in the target image to a position in a robotic arm coordinate system or a base coordinate system. The robotic arm coordinate system may be the fourth coordinate system. The base coordinate system may be the third coordinate system. The processing device 120 may control the movement of the robotic arm based on a position in an EOAT coordinate system (i.e., the fourth coordinate system) or the base coordinate system (i.e., the third coordinate system), so that the EOAT of the robotic arm may perform a corresponding action on the target.

By using the calibration target including the infrared light modulating component and the infrared light emitting component, the processing device 120 may adjust the parameter information of at least one of the calibration target or the imaging device, thereby improving the quality of image collection, and improving the accuracy of the extrinsic parameter matrix (i.e., the first transformation relationship) of the imaging device determined using high-quality images. In addition, the processing device 120 may determine the third transformation relationship based on the first transformation relationships and second transformation relationships corresponding to the different poses, thereby unifying the robot and the imaging device to a standard coordinate system, and controlling the robot to accurately perform positioning, grabbing, movement, or other specific actions based on an accurate hand-eye calibration matrix.

It should be noted that the above description of the process of hand-eye calibration is only for examples and illustrations, and does not limit the scope of application of the present disclosure. For those skilled in the art, various modifications and changes can be made to the hand-eye calibration process under the guidance of the present disclosure. However, such modifications and changes remain within the scope of the present disclosure.

FIG. 4 is a schematic diagram illustrating a calibration target according to some embodiments of the present disclosure.

In some embodiments, as illustrated in FIG. 4, the calibration target 400 may include a target body 410, an infrared light emitting component 420, and an infrared light modulating component 430.

As illustrated in FIG. 4, the target body 410 may be in a checkerboard pattern composed of black and white grids. It should be noted that the pattern of the target body shown in FIG. 4 is only an exemplary illustration and does not limit the scope of protection of the present disclosure. In some embodiments, the target body 410 may be in another pattern, such as an array of dots. In some embodiments, the target body 410 may be circular, square, rectangular, etc.

In some embodiments, the infrared light emitting component 420 may be arranged inside the target body 410. In some embodiments, the infrared light emitting component 420 may be arranged on one side of the target body 410, so that an infrared light emitted by the infrared light emitting component 420 may illuminate the target body 410. In some embodiments, one or more infrared light emitting components 420 may be provided (e.g., 1, 2, 4, 6, etc.). In some embodiments, the infrared light emitting component 420 may include an infrared emitter, an infrared ray tube, or the like. The infrared emitter may be controlled by a single-chip microcontroller to generate a certain regular wave signal, which drives the infrared ray tube to generate an infrared signal. In some embodiments, the infrared light emitting component 420 may be configured to emit the infrared light to the target body 410, so that the infrared light may transmit through the target body to emit the infrared light. Light transmittances of a black region and a white region of the target body are different (e.g., the light transmittance of the black region to the infrared light is less than the light transmittance of the white region to the infrared light), resulting in a color difference between the black region and the white region in the target body image after infrared imaging. In some embodiments, the color difference between the black region and the white region may vary with the intensity of the infrared light. For example, the color difference between the black region and the white region may increase as the intensity of the infrared light increases.

In some embodiments, the infrared light modulating component 430 may be connected with the infrared light emitting component 420. In some embodiments, the infrared light modulating component 430 may be configured to control the infrared light emitting component 420 to emit an infrared light of at least one of a preset waveband or a preset intensity to improve the quality of image collection. In some embodiments, the infrared light modulating component 430 may include a controller, a pulse emitter, a control switch, or the like. In some embodiments, the processing device 120 may control the infrared light emitting component 420 to emit the infrared light of the preset waveband and/or the preset intensity by controlling the infrared light modulating component 430 to emit different pulses. In some embodiments, the infrared light modulating component 430 may be connected with a power supply to supply power to the calibration target 400. In some embodiments, the infrared light modulating component 430 may be connected with the processing device 120 to realize data and/or information exchange between the calibration target 400 and the processing device 120.

Figure 5:
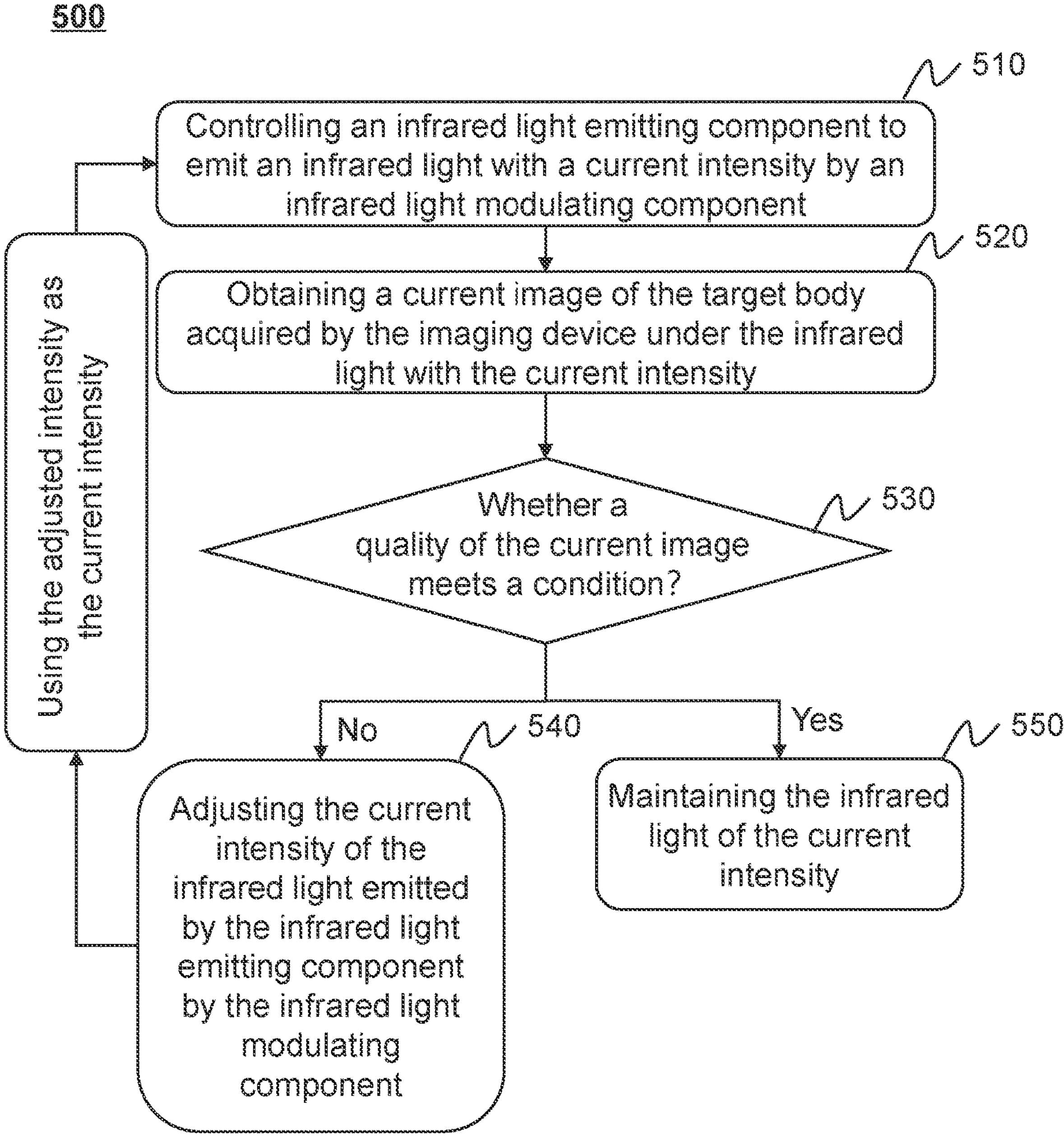
FIG. 5 is a flowchart illustrating an exemplary process for adjusting parameter information of a calibration target according to some embodiments of the present disclosure.

FIG. 5 is a flowchart illustrating an exemplary process for adjusting parameter information of a calibration target according to some embodiments of the present disclosure. As illustrated in FIG. 5, a process 500 may include the following operations. In some embodiments, one or more operations of the process 500 illustrated in FIG. 5 may be implemented in the application scenario 100 of the hand-eye calibration system illustrated in FIG. 1. For example, the process 500 illustrated in FIG. 5 may be stored in the storage device 130 in the form of instructions and called and/or executed by the processing device 120. In some embodiments, operation 310 in FIG. 3 may be executed based on the process 500.

In 510, an infrared light emitting component may be controlled to emit an infrared light with a current intensity by an infrared light modulating component. In some embodiments, operation 510 may be performed by the first obtaining module 210.

The current intensity refers to an infrared light intensity modulated by the infrared light modulating component of the calibration target for collecting a current image of the calibration target.

In some embodiments, the processing device 120 may control the infrared light emitting component to emit the infrared light of the current intensity by the infrared light modulating component. For example, the processing device 120 may send a control signal to the infrared light modulating component. The control signal may include the intensity of the infrared light. After receiving the control signal, the infrared light modulating component may control the infrared light emitting component to emit the infrared light of the intensity. In some embodiments, a user may send the control signal to the infrared light modulating component through a user interaction component (e.g., a knob) on the calibration target. After receiving the control signal, the infrared light modulating component may control the infrared light emitting component to emit the infrared light of the intensity.

In 520, a current image of the target body acquired by the imaging device under the infrared light of the current intensity may be obtained. In some embodiments, operation 520 may be performed by the first obtaining module 210.

The current image of the target body refers to a target body image acquired by the imaging device under the infrared light of the current intensity when the robot is in a certain pose.

In some embodiments, the processing device 120 may control the imaging device to collect the current image of the target body under the infrared light of the current intensity.

In 530, whether the quality of the current image meets a condition may be determined. In some embodiments, operation 530 may be performed by the first obtaining module 210.

In some embodiments, the processing device 120 may determine whether the quality of the current image meets the condition through a machine learning model based on the current image of the target body. The quality of the current image meeting the condition may be that after a target presented in the image is projected to the real world through a transformation relationship between an image coordinate system and a world coordinate system, an error between the quality of the current image and the target in the real world is less than a certain threshold. Alternatively, the quality of the current image meeting the condition may be that by projecting the target of the real world to the image through the transformation relationship between the image coordinate system and the world coordinate system, an error between the quality of the current image and the target presented in the image is less than a certain threshold. In some embodiments, the current image of the target body may be used as an input of the machine learning model, and whether the quality of the current image meets the condition may be determined by processing the current image of the target body using the machine learning model. For example, the processing device 120 may input the current image of the target body into the machine learning model, and the machine learning model may output whether the quality of the current image meets the condition. The machine learning model may be a deep learning neural network model. Exemplary deep learning neural network models may include convolutional neural networks (CNN), deep neural networks (DNN), recurrent neural networks (RNN), or the like, or any combination thereof. The processing device 120 may train the machine learning model using current images of sample target bodies as training data, so that the machine learning model may output whether the corresponding quality of the current image meets the condition based on the current images of the sample target bodies. Labels corresponding to the training data may be manually labeled, or determined by a reprojection error method described below.

In some embodiments, the processing device 120 may obtain feature data of the target body in the current image and reference feature data corresponding to the feature data based on the current image, and determine whether the quality of the current image meets the condition based on the feature data and the reference feature data.

The feature data refers to features (e.g., a position, a size, etc.) of points, lines and/or regions that serve as markers in the current image of the target body. For example, as illustrated in FIG. 4, the target body may be a checkerboard pattern composed of black and white grids, and the feature data may include a corner position in the current image of the target body, a center position of each grid, a side length and area of each grid, etc. As another example, the target body may be a pattern of nine black circles evenly distributed in 3 rows×3 columns on a white background image, and the feature data may be a center position, a circumference, or an area, etc., of each circle in the current image of the target body.

In some embodiments, the processing device 120 may obtain the feature data of the target body in the current image based on the current image. For example, the processing device 120 may extract the feature data from the current image using an image feature extraction algorithm. Exemplary image feature extraction algorithms may include a histogram of oriented gradient (HOG) algorithm, a local binary pattern (LBP) algorithm, a Haar algorithm, etc.

The reference feature data refers to real feature data corresponding to the feature data extracted from the current image in the world coordinate system. For example, as illustrated in FIG. 4, the target body may be in the checkerboard pattern composed of the black and white grids, the feature data extracted from the image may be a position of a corner point in the image, and the reference feature data may be a position (i.e. a reference position) of the corner point in the world coordinate system (or a calibration target coordinate system). As another example, the target body may be the checkerboard pattern composed of the black and white grids, the feature data extracted from the image may be a position of a center position of each grid in the image, and the reference feature data may be a position (i.e., the reference position) of the center position in the world coordinate system (or the calibration target coordinate system). As further another example, the target body may be the pattern of nine black circles evenly distributed in 3 rows×3 columns on the white background image, the feature data extracted from the image may be a position of a center of each circle in the image, and the reference feature data may be a position (i.e., the reference position) of the center position in the world coordinate system (or the calibration target coordinate system). The reference feature data may be stored in the storage device 130. The processing device 120 may obtain the reference feature data from the storage device 130.

In some embodiments, the processing device 120 may obtain a reprojection error based on the feature data and the reference feature data, determine whether the reprojection error is greater than a preset threshold, and determine that the quality of the current image does not meet the condition in response to a determination that the reprojection error is greater than the preset threshold.

In some embodiments, the processing device 120 may convert the reference feature data to a current image coordinate system based on intrinsic parameters and extrinsic parameters of the imaging device to obtain estimated feature data, and determine the reprojection error through an error between the estimated feature data and the feature data extracted from the image.

In some embodiments, the processing device 120 may convert the feature data extracted from the image to a first coordinate system based on the intrinsic parameters and the extrinsic parameters of the imaging device to obtain the estimated feature data, and determine the reprojection error through the error between the estimated feature data and the feature data. In some embodiments, the processing device 120 may determine the reprojection error by calculating a mean value, a maximum value, a minimum value, a median value, etc., of absolute values of the estimated feature data and the feature data corresponding to different poses.

In some embodiments, taking converting the reference feature data to the current image coordinate system as the estimated feature data as an example, the processing device 120 may obtain the reprojection error based on formula (1):

$$\text{reprojection error} = \frac{1}{n}\sum_{i=1}^{n}\left\|p_i^{img} - KMp_i^{obj}\right\|,$$

wherein n denotes a count of the feature data on the calibration target, $$p_i^{img}$$

denotes coordinates of an ith feature data in the current image coordinate system, $$p_i^{obj}$$

denotes coordinates of the ith feature data in the first coordinate system (i.e., the calibration target coordinate system), a matrix K denotes intrinsic parameters of the imaging device, a matrix M denotes extrinsic parameters (i.e., the first transformation relationship in the present disclosure) of the imaging device, $$KMp_i^{obj}$$

denotes coordinates of an ith estimated feature data in the current image coordinate system, and i denotes a natural number. The intrinsic parameters of the imaging device may be inherent parameters of a camera, and the extrinsic parameters of the imaging device may be the extrinsic parameters for the last calibration of the imaging device.

A process that the feature data extracted from the current image is converted to the current first coordinate system to obtain the estimated feature data, and the reprojection error is determined based on the reference feature data may be similar to a process that the reference feature data is converted to the current image coordinate system to obtain the estimated feature data, and the reprojection error is determined, which is not repeated here.

In some embodiments, in response to a determination that the quality of the current image does not meet the condition, the processing device 120 may perform operation 540 to adjust the current intensity of the infrared light emitted by the infrared light emitting component by the infrared light modulating component, and use the adjusted intensity as the current intensity.

In 540, the current intensity of the infrared light emitted by the infrared light emitting component may be adjusted by the infrared light modulating component. In some embodiments, operation 540 may be performed by the first obtaining module 210.

Since the target body may be the checkerboard pattern composed of the black and white grids, or the pattern of nine black circles evenly distributed in the form of 3 rows×3 columns on the white background image, when the infrared light modulating component adjusts the current intensity of the infrared light emitted by the infrared light emitting component, the light transmittances of the black region on the target body and the white region on the target body may be different. Therefore, the black region on the target body and the white region on the target body may have a color difference. That is, when the intensity of the infrared light is high, the color difference between the black region on the target body and the white region on the target body may be large; and when the intensity of the infrared light is low, the color difference between the black region on the target body and the white region on the target body may be small.

The processing device 120 may adjust the current intensity of the infrared light emitted by the infrared light emitting component by the infrared light modulating component, so that the color difference between the black region on the target body and the white region on the target body may change, and the adjusted intensity may be used as the current intensity to proceed to operations 510-530.

In some embodiments, in response to a determination that the quality of the current image meets the condition, the processing device 120 may maintain the infrared light of the current intensity by performing operation 550.

In 550, the infrared light of the current intensity may be maintained. In some embodiments, operation 550 may be performed by the first obtaining module 210.

In some embodiments, the processing device may control the infrared light emitting component to emit the infrared light of the current intensity by the infrared light modulating component. The processing device may control the imaging device to collect an image (e.g., the image in 310) of the calibration target under the infrared light of the current intensity for hand-eye calibration. Descriptions regarding the specific process of hand-eye calibration may be found in the detailed descriptions in FIG. 3.

In some embodiments, the processing device 120 may adjust the current intensity of the infrared light emitted by the infrared light emitting component by the infrared light modulating component by repeatedly performing operations 510-540 until the quality of the current image meets the condition. For example, the processing device 120 may control the current intensity of the infrared light emitted by the infrared light emitting component to be increased or decreased by the infrared light modulating component, so that the reprojection error may be less than or equal to the preset threshold.

In some embodiments, referring to the operations 510-540 of adjusting the current intensity of the infrared light emitted by the infrared light emitting component by the infrared light modulating component, the processing device 120 may fine-adjust a waveband of the infrared light emitted by the infrared light emitting component or adjust the parameter information of the imaging device by the infrared light modulating component, so that the quality of the current image may meet the condition. For example, the processing device 120 may fine-adjust the waveband of the infrared light emitted by the infrared light emitting component or adjust a distance or an angle between the imaging device and the calibration target by the infrared light modulating component, so that the reprojection error may be less than or equal to the preset threshold.

Whether the quality of the current image meets the condition may be analyzed through the reprojection error. In response to a determination that the quality of the current image does not meet the condition, the calibration target including the infrared light modulating component and the infrared light emitting component and/or the parameter information of the imaging device may be adjusted, thereby improving the quality of the current image, and improving the accuracy of data collection.

It should be noted that the above description of the process for adjusting the parameter information of the calibration target is only for exemplary illustration, and does not limit the scope of application of the present disclosure. For those skilled in the art, under the guidance of the present disclosure, various modifications and changes may be made to the process for adjusting the parameter information of the calibration target. However, such modifications and changes remain within the scope of the present disclosure.

Figure 6:
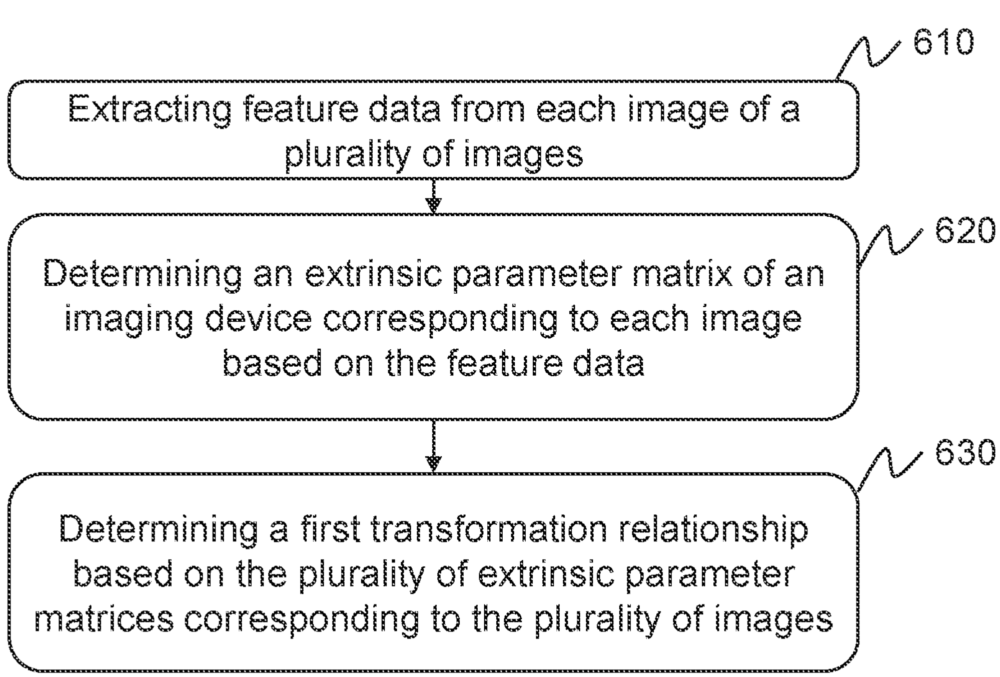
FIG. 6 is a flowchart illustrating an exemplary process of determining a first transformation relationship according to some embodiments of the present disclosure.

FIG. 6 is a flowchart illustrating an exemplary process of determining a first transformation relationship according to some embodiments of the present disclosure. As illustrated in FIG. 6, a process 600 may include the following operations. In some embodiments, one or more operations of the process 600 illustrated in FIG. 6 may be implemented in the application scenario 100 of the hand-eye calibration system illustrated in FIG. 1. For example, the process 600 illustrated in FIG. 6 may be stored in the storage device 130 in the form of instructions and called and/or executed by the processing device 120. In some embodiments, operation 320 in FIG. 3 may be performed based on the process 600.

In 610, feature data may be extracted from each of a plurality of target body images. In some embodiments, operation 610 may be performed by the first determination module 220. A count of the plurality of target body images may be greater than a threshold. For example, the threshold of the count of the plurality of target body images may be 100.

The processing device 120 may extract the feature data from each of the plurality of target body images using an image feature extraction algorithm. Descriptions regarding the image feature extraction algorithm may be found in operation 530 and related descriptions thereof.

In 620, an extrinsic parameter matrix of an imaging device corresponding to each of the plurality of target body images may be determined based on the feature data. In some embodiments, operation 620 may be performed by the first determination module 220.

In some embodiments, the processing device 120 may perform a filtering operation on the feature data to obtain filtered feature data, and determine the extrinsic parameter matrix based on the filtered feature data.

In some embodiments, the processing device 120 may perform the filtering operations on the feature data using filtering algorithms such as limiting filtering, median filtering, trimmed mean filtering, etc.

In some embodiments, the processing device 120 may determine the extrinsic parameter matrix based on the filtered feature data. In some embodiments, the processing device 120 may determine the extrinsic parameter matrix through a PNP algorithm based on the filtered feature data.

In some embodiments, the processing device 120 may perform the filtering operation on the feature data to obtain the filtered feature data, and determine the extrinsic parameter matrix based on the filtered feature data. For example, the processing device 120 may obtain reference feature data of the filtered feature data in the first coordinate system of the calibration target. The processing device 120 may determine the extrinsic parameter matrix based on the filtered feature data and the reference feature data using algorithms such as the PNP algorithm, a BA algorithm, etc. The PNP algorithm may include a P3P algorithm, a DLT algorithm, etc.

The processing device 120 may determine a plurality of extrinsic parameter matrices based on the feature data extracted from the plurality of target body images. Each extrinsic parameter matrix may correspond to one of the plurality of target body images.

In some embodiments, the processing device 120 may determine a plurality of first extrinsic parameter matrices corresponding to the plurality of target body images based on the feature data, and perform the filtering operation on the plurality of first extrinsic parameter matrices to determine the plurality of extrinsic parameter matrices.

In some embodiments, the processing device 120 may determine the plurality of first extrinsic parameter matrices corresponding to the plurality of target body images based on the feature data. In some embodiments, the processing device 120 may determine the plurality of first extrinsic parameter matrices corresponding to the plurality of target body images through the PNP algorithm based on the feature data. A process of determining the plurality of first extrinsic parameter matrices corresponding to the plurality of target body images based on the feature data may be similar to a process of determining the extrinsic parameter matrices based on the filtered feature data, which is not repeated here.

In some embodiments, the processing device 120 may perform the filtering operation on the plurality of first extrinsic parameter matrices using the filtering algorithms such as limiting filtering, median filtering, trimmed mean filtering, etc. In some embodiments, the filtering algorithm may include random sample consensus (RANSAC). Specifically, the processing device 120 may average the plurality of first extrinsic parameter matrices, and determine whether the first extrinsic parameter matrix is filtered based on whether a distance between each of the plurality of first extrinsic parameter matrices and a mean value of the plurality of first extrinsic parameter matrices meets a threshold, thereby obtaining the plurality of first extrinsic parameter matrices.

In some embodiments, the processing device 120 may perform the filtering operation on the feature data to obtain the filtered feature data, determine a plurality of second extrinsic parameter matrices corresponding to the plurality of target body images based on the filtered feature data, and perform the filtering operation on the plurality of second extrinsic parameter matrices to determine the plurality of extrinsic parameter matrices. Processes of determining the plurality of second extrinsic parameter matrices corresponding to the plurality of target body images, and performing the filtering operation on the plurality of second extrinsic parameter matrices may be similar to processes of determining the plurality of first extrinsic parameter matrices corresponding to the plurality of target body images, and performing the filtering operation on the plurality of first extrinsic parameter matrix, which are not repeated here.

In 630, a first transformation relationship may be determined based on the plurality of extrinsic parameter matrices corresponding to the plurality of target body images. In some embodiments, operation 630 may be performed by the first determination module 220.

In some embodiments, the processing device 120 may calculate a mean value or a weighted mean value of the plurality of extrinsic parameter matrices corresponding to the plurality of target body images to determine a final extrinsic parameter matrix, and then use the final extrinsic parameter matrix as the first transformation relationship.

The feature data extracted from each of the plurality of target body images may introduce various noises (e.g., thermal noise caused by resistance, thermal noise caused by a field effect tube, photon noise, dark current noise, optical response non-uniformity noise, etc.) in each of the plurality of target body images due to factors such as sensor material properties of the imaging device, a working environment, electronic components, a circuit structure, etc. These noises may cause the quality of the feature data extracted from each of the plurality of target body images to be affected (e.g., noises, errors, etc.), which in turn leads to lower accuracy of the extrinsic parameter matrix determined based on the feature data. Therefore, the processing device 120 may perform the filtering operation through the feature data and/or the extrinsic parameter matrix to filter out some feature data with large errors (e.g., remove jump singular points), thereby obtaining a more accurate first transformation relationship.

It should be noted that the above description of the process of determining the first transformation relationship is only for exemplary illustration, and does not limit the scope of application of the present disclosure. For those skilled in the art, various modifications and changes may be made to the process of determining the first transformation relationship under the guidance of the present disclosure. However, such modifications and changes remain within the scope of the present disclosure. In some embodiments, operation 620 may be omitted, i.e., the first transformation relationship may be obtained without performing the filtering operation on the feature data.

FIG. 7 is a flowchart illustrating an exemplary process of determining a third transformation relationship according to some embodiments of the present disclosure. As illustrated in FIG. 7, a process 700 may include the following operations. In some embodiments, one or more operations of the process 700 illustrated in FIG. 7 may be implemented in the application scenario 100 of the hand-eye calibration system illustrated in FIG. 1. For example, the process 700 illustrated in FIG. 7 may be stored in the storage device 130 in the form of instructions and called and/or executed by the processing device 120. Operation 340 in FIG. 3 may be performed based on the process 700.

In 710, a plurality of sets of input data of a nonlinear optimization model may be constructed based on first transformation relationships and second transformation relationships corresponding to different poses. Each set of input data may correspond to the first transformation relationship and the second transformation relationship corresponding to a certain pose of the different poses. In some embodiments, operation 710 may be performed by the second determination module 240. A process of determining the first transformation relationships and the second transformation relationships in the different poses may be found in the detailed descriptions in FIG. 3.

In some embodiments, each set of input data may include a first relative transformation and a second relative transformation. The first relative transformation in each set of input data represents a position transformation of a fourth coordinate system (i.e., an EOAT coordinate system) in the pose corresponding to each set of input data relative to a reference pose. The first relative transformation may be constructed based on the second transformation relationship (i.e., a transformation relationship between the EOAT coordinate system and a robotic arm base coordinate system). For example, the first relative transformation in a certain pose may be obtained based on the second transformation relationship in the certain pose and a second transformation relationship in the reference pose. Furthermore, for example, the second transformation relationship may be represented by a second matrix, and the first relative transformation in the certain pose may be calculated based on the second matrix in the certain pose multiplied by an inverse matrix of the second matrix in the reference pose.

The second relative transformation in each set of input data represents a position transformation of the second coordinate system (i.e., an imaging device coordinate system) in the pose corresponding to each set of input data relative to the reference pose. The second relative transformation may be constructed based on the first transformation relationship (i.e., a transformation relationship between the imaging device coordinate system and a calibration target coordinate system). For example, the second relative transformation in a certain pose may be obtained based on the first transformation relationship in the certain pose and the first transformation relationship in the reference pose. Furthermore, for example, the first transformation relationship may be represented by a first matrix, and the second relative transformation in the certain pose may be calculated based on the first matrix in the certain pose multiplied by an inverse matrix of the first matrix in the reference pose.

In some embodiments, the reference pose of each set of input data may be the same. For example, different poses of the robot may change in a time sequence. The reference pose of each set of input data may be unified as an initial pose of the robot, such as a pose of the robot before changing to a different pose, or the first change of pose of the different poses. In some embodiments, the reference pose of each set of input data may be different. For example, the reference pose of each set of input data may be a pose corresponding to a previous set of input data.

In some embodiments, for example, hand-eye calibration may be performed on an eye-in-hand robot by taking the first change of pose of the robot of the different poses as the reference pose. The processing device 120 may obtain S target body images acquired by the imaging device in S different poses. Each pose may correspond to one target body image, and one target body image may correspond to one set of input data, thereby obtaining S−1 sets of input data. The first relative transformation in each set of input data may be represented by $A_t$, and the second relative transformation in each set of input data may be represented by $B_t$. $A_t$ may be obtained based on a second transformation relationship $$\left(\text{i.e., } {}^{Base}_{tool}T^{j=t}\right)$$

in the tth pose and a second transformation relationship $$\left(\text{i.e., } {}^{Base}_{tool}T^{j=1}\right)$$

in the reference pose. $B_t$ may be obtained based on a first transformation relationship $$\left(\text{i.e., } {}^{Camera}_{Object}T^{j=t}\right)$$

in the tth pose and a first transformation relationship $$\left(\text{i.e., } {}^{Camera}_{Object}T^{j=1}\right)$$

in the reference pose. That is, $A_t$ and $B_t$ may be obtained from formula (2) and formula (3):

$$A_t = \left({}^{Base}_{tool}T^{j=t}\right)^{-1} \cdot \left({}^{Base}_{tool}T^{j=t}\right), \tag{2}$$

$$B_t = \left({}^{Camera}_{Object}T^{j=t}\right)^{-1} \cdot \left({}^{Camera}_{Object}T^{j=t}\right), \tag{3}$$

wherein $A_t$ denotes the first relative transformation, $B_t$ denotes the second relative transformation, $${}^{Base}_{tool}T^{j=t}$$

denotes the second transformation relationship in the reference pose (the initial pose of the robot, i.e., the first change of pose of the different poses), $${}^{Base}_{tool}T^{j=t}$$

denotes the second transformation relationship in the tth pose, the $$^{Camera}_{Object}T^{j=t}$$

denotes the first transformation relationship in the reference pose, $$^{Camera}_{Object}T^{j=t}$$

denotes the first transformation relationship in the tth pose, j denotes which pose is, t=2 . . . S, and t and S denote natural numbers.

In some embodiments, the processing device 120 may construct an optimization model based on a hand-eye calibration equation set AX=XB. For example, the processing device 120 may construct the optimization model through formula (4) (i.e., the nonlinear optimization model):

$$\min f(X) = \sum_{t=1}^{s} \|A_t X - XB_t\|, \quad (4)$$

wherein X denotes the third transformation relationship, $A_t$ denotes the first relative transformation in the tth pose, $B_t$ denotes the second relative transformation in the tth pose, t=1, 2 . . . S, and t and S denote natural numbers.

In some embodiments, the processing device 120 may optimize an initial third transformation relationship through formula (5) or formula (6) with a penalty term:

$$\min f(X) = \sum_{t=1}^{s} \ln(\|A_t X - XB_t\|), \quad (5)$$

$$\min f(X) = \sum_{t=1}^{s} \ln(\|X^{-1} A_t XB_t\|), \quad (6)$$

wherein X denotes the third transformation relationship, A t denotes the first relative transformation in the tth pose, B t denotes the second relative transformation in the tth pose, t=1, 2 . . . S, and t and S denote natural number. Adding the penalty term may alleviate an overfitting phenomenon, thereby enabling the results to be more accurate.

In some embodiments, a process of performing hand-eye calibration on an eye-to-hand robot may be similar to a process of performing hand-eye calibration on the eye-in-hand robot, which is not repeated here.

In 720, a third transformation relationship may be determined based on the nonlinear optimization model and the plurality of sets of input data. In some embodiments, operation 720 may be performed by the second determination module 240.

In some embodiments, the processing device 120 may obtain an initial value of a matrix X through a Tsai algorithm, or the like. In some embodiments, the processing device 120 may use a 0 matrix as the initial value of the matrix X.

The processing device 120 may execute multiple times of iterative algorithms until a termination condition is met, thereby optimizing an initial third transformation relationship, and obtaining a final third transformation relationship. In each iteration, the processing device 120 may input the plurality of sets of input data into the nonlinear optimization model to obtain errors generated by the plurality of sets of input data. The processing device 120 may determine whether the termination condition is met. If the termination condition is not met, the processing device 120 may update a value of the matrix X and perform a next iteration based on an updated value of the matrix X. If the termination condition is met, the processing device 120 may terminate the iteration, and use the updated value of the matrix X generated by the current iteration as the third transformation relationship. Meeting the termination condition may include that an error value is minimized, the error value is less than a certain threshold, the error value is less than the certain threshold in last few iterations, or a certain count of iterations is performed.

The processing device 120 may further improve a calibration accuracy by introducing a nonlinear optimization algorithm into the process of hand-eye calibration calculation based on the collected high-precision feature data.

It should be noted that the above description of the process of determining the third transformation relationship is only for exemplary illustration, and does not limit the scope of application of the present disclosure. For those skilled in the art, various modifications and changes may be made to the process of determining the third transformation relationship under the guidance of the present disclosure. However, such modifications and changes remain within the scope of the present disclosure.

Figure 8:
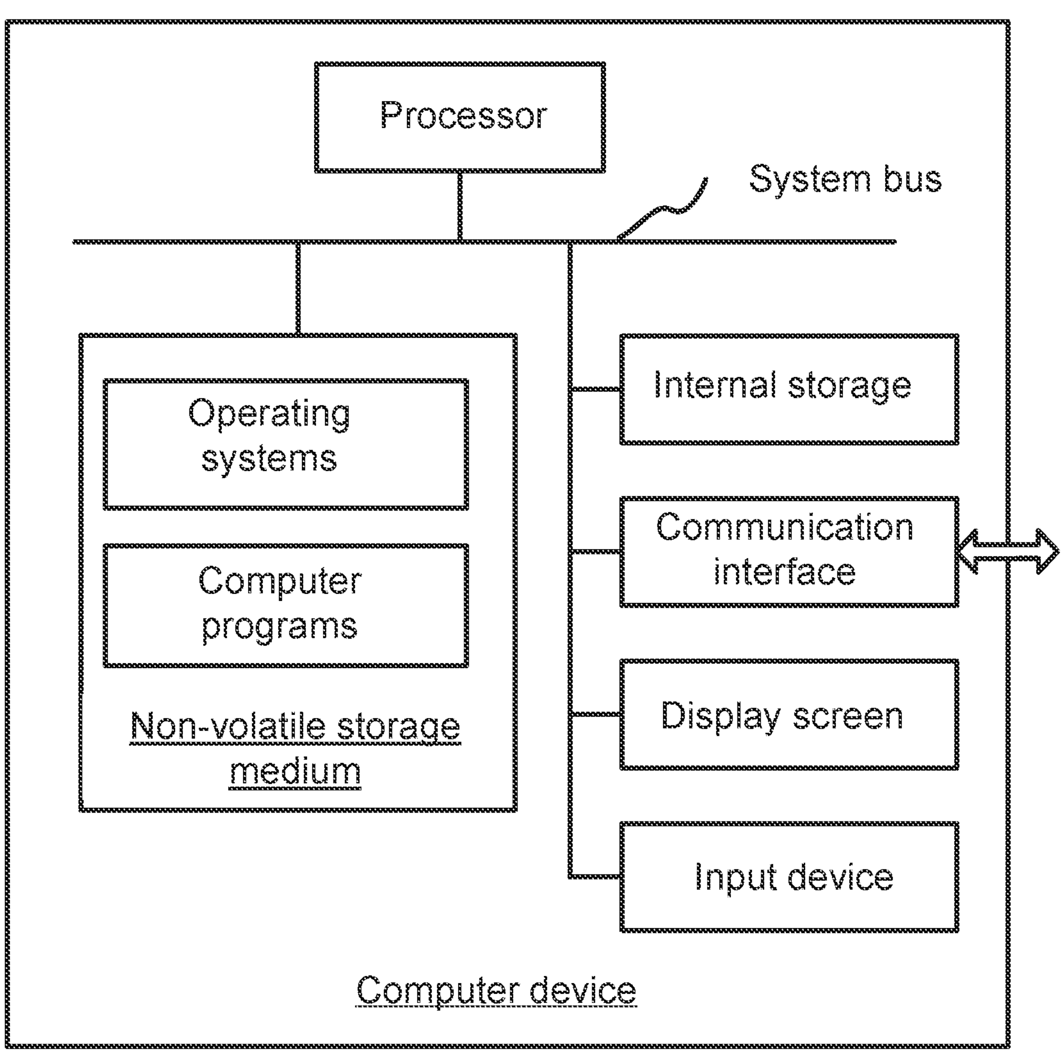
FIG. 8 is a schematic diagram illustrating an internal structure of a computer device according to some embodiments of the present disclosure.

FIG. 8 is a schematic diagram illustrating an internal structure of a computer device according to some embodiments of the present disclosure.

The computer device may include a processor, a storage, a communication interface, a display screen, and an input device connected through a system bus. The processor of the computer device may be configured to provide computing and control capabilities. The storage of the computer device may include a non-volatile storage medium and an internal storage. The non-volatile storage medium may store operating systems and computer programs. The internal storage may provide an environment for the execution of the operating systems and the computer programs in the non-volatile storage medium. The communication interface of the computer device may be configured to perform wired or wireless communication with an external terminal. The wireless communication may be implemented through WIFI, an operator network, Near Field Communication (NFC), or other technologies. When executed by the processor, the computer programs may implement the hand-eye calibration method. The display screen of the computer device may be a liquid crystal display screen or an electronic ink display screen. The input device of the computer device may be a touch layer covered on the display screen, or buttons, a trackball, or a touch pad provided on a housing of the computer device, or an external keyboard, touch pad, or mouse, etc.

Those skilled in the art can understand that the structure illustrated in FIG. 8 is only a block diagram of a partial structure related to the solution of the present disclosure, and does not constitute a limitation on the computer device to which the solution of the present disclosure is applied. The computer device may include more or fewer parts than those illustrated in the figures, or combine certain parts, or have a different arrangement of parts.

One embodiment of the prevent disclosure provides a computer device comprising a storage and a processor. Computer programs may be stored in the storage. When the processor executes the computer program, the processor may implement the following operations. Target body images of a calibration target acquired by an imaging device when a robot is in different poses may be obtained. For any pose, a first transformation relationship between a first coordinate system of the calibration target and a second coordinate system of the imaging device in the pose may be determined based on the target body image collected in the pose. A second transformation relationship between a third coordinate system and a fourth coordinate system of the robot may be obtained. A third transformation relationship between the second coordinate system and one of the third coordinate system and the fourth coordinate system may be determined based on the first transformation relationships and second transformation relationships corresponding to the different poses. The third coordinate system may be related to a base of the robot. The fourth coordinate system may be related to an EOAT of a robotic arm of the robot.

In one embodiment, when the processor executes the computer programs, the processor may further implement the following operations. Parameter information of at least one of the calibration target or the imaging device may be adjusted. The target body image collected in the pose may be obtained by controlling the imaging device to perform imaging on the target body based on the adjusted parameter information.

In one embodiment, when the processor executes the computer programs, the processor may further implement the following operations. An infrared light emitting component may be controlled to emit an infrared light of a corresponding waveband by an infrared light modulating component based on an infrared light waveband that the imaging device can collect.

In one embodiment, when the processor executes the computer programs, the processor may further implement the following operations. The infrared light emitting component may be controlled to emit an infrared light of a current intensity by the infrared light modulating component. A current image of the target body acquired by the imaging device under the infrared light of the current intensity may be obtained. Whether the quality of the current image meets a condition may be determined. In response to a determination that the quality of the current image does not meet the condition, the current intensity of the infrared light emitted by the infrared light emitting component may be adjusted by the infrared light modulating component.

In one embodiment, when the processor executes the computer programs, the processor may further implement the following operations. Feature data of the target body in the current image may be obtained based on the current image. Reference feature data corresponding to the feature data of the target body in the current image may be obtained. Whether the quality of the current image meets the condition may be determined based on the feature data and the reference feature data.

In one embodiment, when the processor executes the computer programs, the processor may further implement the following operations. A reprojection error may be obtained based on the feature data and the reference feature data. Whether the reprojection error is greater than a preset threshold may be determined. In response to a determination that the reprojection error is greater than the preset threshold, it is determined that the quality of the current image does not meet the condition.

In one embodiment, when the processor executes the computer programs, the processor may further implement the following operations. The reference feature data may be converted to a current image coordinate system to obtain estimated feature data based on intrinsic parameters and extrinsic parameters of the imaging device. The reprojection error may be determined based on an error between the estimated feature data and the feature data.

In one embodiment, when the processor executes the computer programs, the processor may further implement the following operations. For each of the target body images, a count of the target body images may be greater than a threshold, and feature data may be extracted from each of the target body images. An extrinsic parameter matrix of the imaging device corresponding to each of the target body images may be determined based on the feature data. The first transformation relationship may be determined based on a plurality of extrinsic parameter matrices corresponding to the target body images.

In one embodiment, when the processor executes the computer programs, the processor may further implement the following operations. A filtering operation may be performed on the feature data to obtain filtered feature data. The extrinsic parameter matrix may be determined based on the filtered feature data.

In one embodiment, when the processor executes the computer programs, the processor may further implement the following operations. A plurality of first extrinsic parameter matrices corresponding to the plurality of target body images may be determined based on the feature data. A filtering operation may be performed on the plurality of first extrinsic parameter matrices to determine the plurality of extrinsic parameter matrices.

In one embodiment, when the processor executes the computer programs, the processor may further implement the following operations. A filtering operation may be performed on the feature data to obtain the filtered feature data. A plurality of second extrinsic parameter matrices corresponding to the plurality of target body images may be determined based on the filtered feature data. A filtering operation may be performed on the plurality of second extrinsic parameter matrices to determine the plurality of extrinsic parameter matrices.

In one embodiment, when the processor executes the computer programs, the processor may further implement the following operations. A plurality of sets of input data of a nonlinear optimization model may be constructed based on the first transformation relationships and the second transformation relationships corresponding to the different poses. Each set of input data may correspond to the first transformation relationship and the second transformation relationship corresponding to each pose of the different poses. The third transformation relationship may be determined based on the nonlinear optimization model and the plurality of sets of input data.

One embodiment of the present disclosure provides a non-transitory computer-readable storage medium comprising computer programs. When executed by a processor, the computer programs may direct the processor to implement the following operations. Target body images of a calibration target acquired by an imaging device when a robot is in different poses may be obtained. For any pose, a first transformation relationship between a first coordinate system of the calibration target and a second coordinate system of the imaging device in the pose may be determined based on the target body image collected in the pose. A second transformation relationship between a third coordinate system and a fourth coordinate system of the robot may be obtained. A third transformation relationship between the second coordinate system and one of the third coordinate system and the fourth coordinate system may be determined based on the first transformation relationships and second transformation relationships corresponding to the different poses. The third coordinate system may be related to a base of the robot. The fourth coordinate system may be related to an EOAT of a robotic arm of the robot.

In one embodiment, when executed by the processor, the computer programs may direct the processor to further implement the following operations. Parameter information of at least one of the calibration target or the imaging device may be adjusted. The target body image collected in the pose may be obtained by controlling the imaging device to perform imaging on the target body based on the adjusted parameter information.

In one embodiment, when executed by the processor, the computer programs may direct the processor to further implement the following operations. An infrared light emitting component may be controlled to emit an infrared light of a corresponding waveband by an infrared light modulating component based on an infrared light waveband that the imaging device can collect.

In one embodiment, when executed by the processor, the computer programs may direct the processor to further implement the following operations. The infrared light emitting component may be controlled to emit an infrared light of a current intensity by the infrared light modulating component. A current image of the target body acquired by the imaging device under the infrared light of the current intensity may be obtained. Whether the quality of the current image meets a condition may be determined. In response to a determination that the quality of the current image does not meet the condition, the current intensity of the infrared light emitted by the infrared light emitting component may be adjusted by the infrared light modulating component.

In one embodiment, when executed by the processor, the computer programs may direct the processor to further implement the following operations. Feature data of the target body in the current image may be obtained based on the current image. Reference feature data corresponding to the feature data of the target body in the current image may be obtained. Whether the quality of the current image meets the condition may be determined based on the feature data and the reference feature data.

In one embodiment, when executed by the processor, the computer programs may direct the processor to further implement the following operations. A reprojection error may be obtained based on the feature data and the reference feature data. Whether the reprojection error is greater than a preset threshold may be determined. In response to a determination that the reprojection error is greater than the preset threshold, it is determined that the quality of the current image does not meet the condition.

In one embodiment, when executed by the processor, the computer programs may direct the processor to further implement the following operations. The reference feature data may be converted to a current image coordinate system to obtain estimated feature data based on intrinsic parameters and extrinsic parameters of the imaging device. The reprojection error may be determined based on an error between the estimated feature data and the feature data.

In one embodiment, when executed by the processor, the computer programs may direct the processor to further implement the following operations. For each of the target body images, a count of the target body images may be greater than a threshold, and feature data may be extracted from each of the target body images. An extrinsic parameter matrix of the imaging device corresponding to each of the target body images may be determined based on the feature data. The first transformation relationship may be determined based on a plurality of extrinsic parameter matrices corresponding to the target body images.

In one embodiment, when executed by the processor, the computer programs may direct the processor to further implement the following operations. A filtering operation may be performed on the feature data to obtain filtered feature data. The extrinsic parameter matrix may be determined based on the filtered feature data.

In one embodiment, when executed by the processor, the computer programs may direct the processor to further implement the following operations. A plurality of first extrinsic parameter matrices corresponding to the plurality of target body images may be determined based on the feature data. A filtering operation may be performed on the plurality of first extrinsic parameter matrices to determine the plurality of extrinsic parameter matrices.

In one embodiment, when executed by the processor, the computer programs may direct the processor to further implement the following operations. A filtering operation may be performed on the feature data to obtain the filtered feature data. A plurality of second extrinsic parameter matrices corresponding to the plurality of target body images may be determined based on the filtered feature data. A filtering operation may be performed on the plurality of second extrinsic parameter matrices to determine the plurality of extrinsic parameter matrices.

In one embodiment, when executed by the processor, the computer programs may direct the processor to further implement the following operations. A plurality of sets of input data of a nonlinear optimization model may be constructed based on the first transformation relationships and the second transformation relationships corresponding to the different poses. Each set of input data may correspond to the first transformation relationship and the second transformation relationship corresponding to each pose of the different poses. The third transformation relationship may be determined based on the nonlinear optimization model and the plurality of sets of input data.

Those having ordinary skills in the art can understand that all or part of the processes in the methods of the above embodiments can be completed by instructing relevant hardware through computer programs. The computer programs may be stored in a non-volatile computer-readable storage medium. When executed by a computer, the computer programs may include the processes of the embodiments of the above methods. Any reference to memory, storage, database, or other media used in the embodiments provided in the present disclosure may include at least one of a non-volatile storage and a volatile storage. The non-volatile storage may include a read-only memory (ROM), a magnetic tape, a floppy disk, a flash memory, or an optical memory, etc. The volatile storage may include a random access memory (RAM) or an external cache memory. As an illustration and not a limitation, RAM may be in various forms, such as a static random access memory (SRAM) or a dynamic random access memory (DRAM).

In some embodiments, the calibration target may include a target body, an infrared light emitting component, and an infrared light modulating component. The infrared light emitting component may be configured to emit an infrared light to the target body. The infrared light modulating component may be configured to control the infrared light emitting component to emit an infrared light of at least one of a preset waveband or a preset intensity.

In some embodiments, a hand-eye calibration device may include a processor and a storage. The storage may be configured to store instructions. When executed by the processor, the instructions may direct the device to implement the hand-eye calibration method.

In some embodiments, the non-transitory computer-readable storage medium may store the computer instructions. After read by the computer, the computer instructions in the storage medium may direct the computer to execute the hand-eye calibration method.

Possible beneficial effects brought by the embodiments of the present disclosure include but are not limited to the following content. (1) By using the calibration target including the infrared light modulating component and the infrared light emitting component, the parameter information of the calibration target and/or imaging device is adjusted to improve the quality of image collection. In addition, the transformation relationship (i.e., the third transformation relationship) between the second coordinate system of the imaging device and the third coordinate system of the base of the robot or between the second coordinate system of the imaging device and the fourth coordinate system of the EOAT of the robotic arm of the robot is determined based on the transformation relationship (i.e., the first transformation relationship) between the first coordinate system of the calibration target in the different poses and the second coordinate system of the imaging device and the transformation relationship (i.e. the second transformation relationship) between the third coordinate system of the base of the robot and the fourth coordinate system of the EOAT of the robotic arm of the robot, so that the robot and the imaging device can be unified to a standard coordinate system, and the robot can be accurately controlled to perform positioning, grabbing, moving, or other specific actions based on the hand-eye calibration matrix. (2) Whether the quality of the current image meets the condition is analyzed through the reprojection error. In response to a determination that the quality of the current image does not meet the condition, the calibration target including the infrared light modulating component and the infrared light emitting component and/or the parameter information of the imaging device are adjusted, thereby improving the quality of the current image, and improving the accuracy of data collection. (3) The feature data extracted from the target body images may introduce various noises (e.g., thermal noise caused by resistance, channel thermal noise of a field effect tube, photon noise, dark current noise, optical response non-uniformity noise, etc.) due to factors such as sensor material properties, working environments, electronic components, circuit structures, etc., which in turn leads to low accuracy of the extrinsic parameter matrix determined based on the feature data. Accordingly, by performing the filtering operation on the feature data and/or the extrinsic parameter matrix, some feature data with large errors can be filtered out and jump singular points can be removed, thereby obtaining a more accurate first transformation relationship. (4) The calibration accuracy is further improved by introducing the nonlinear optimization algorithm in the process of hand-eye calibration calculation based on the collected high-precision feature data.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about," "approximately" or "substantially" in some examples. Unless otherwise stated, "about," "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A hand-eye calibration method for a robot, comprising:

obtaining images of a target body of a calibration target acquired by an imaging device when the robot is in different poses, the calibration target further including an infrared light emitting component and an infrared light modulating component, the infrared light emitting component being provided inside the target body, the infrared light emitting component being configured to emit an infrared light in an infrared light waveband that the imaging device is capable of collecting to the target body, different regions of the target body having different transmittances to the infrared light emitted by the infrared light emitting component, and the infrared light modulating component being configured to control the infrared light emitting component to emit an infrared light of at least one of a preset waveband or a preset intensity;

for any pose, determining, based on at least one image collected in the pose, a first transformation relationship, in the pose, between a first coordinate system of the calibration target and a second coordinate system of the imaging device;

obtaining a second transformation relationship between a third coordinate system and a fourth coordinate system of the robot; and determining, based on the first transformation relationships and the second transformation relationships corresponding to the different poses, a third transformation relationship between the second coordinate system and one of the third coordinate system and the fourth coordinate system, the third coordinate system being related to a base of the robot, and the fourth coordinate system being related to an end-of-arm tool (EOAT) of a robotic arm of the robot.

2. The hand-eye calibration method according to claim 1, wherein the obtaining images of a target body of a calibration target acquired by an imaging device when the robot is in different poses includes:

adjusting parameter information of at least one of the calibration target or the imaging device; and obtaining the at least one image collected in the pose by controlling the imaging device to perform imaging on the target body based on the adjusted parameter information.

3. The hand-eye calibration method according to claim 2, wherein the adjusting parameter information of at least one of the calibration target or the imaging device includes:

controlling, based on an infrared light waveband that the imaging device is capable of collecting, the infrared light emitting component to emit an infrared light of a corresponding waveband by the infrared light modulating component.

4. The hand-eye calibration method according to claim 2, wherein the adjusting parameter information of at least one of the calibration target or the imaging device includes:

controlling, by the infrared light modulating component, the infrared light emitting component to emit an infrared light of a current intensity;

obtaining a current image of the target body acquired by the imaging device under the infrared light of the current intensity;

determining whether a quality of the current image meets a condition; and in response to a determination that the quality of the current image does not meet the condition, adjusting, by the infrared light modulating component, the current intensity of the infrared light emitted by the infrared light emitting component.

5. The hand-eye calibration method according to claim 4, wherein the determining whether a quality of the current image meets a condition includes:

obtaining, based on the current image, feature data of the target body in the current image;

obtaining reference feature data corresponding to the feature data of the target body in the current image; and determining, based on the feature data and the reference feature data, whether the quality of the current image meets the condition.

6. The hand-eye calibration method according to claim 5, wherein the determining, based on the feature data and the reference feature data, whether the quality of the current image meets the condition includes:

obtaining a reprojection error based on the feature data and the reference feature data;

determining whether the reprojection error is greater than a preset threshold; and in response to a determination that the reprojection error is greater than the preset threshold, determining that the quality of the current image does not meet the condition.

7. The hand-eye calibration method according to claim 6, wherein the obtaining a reprojection error based on the feature data and the reference feature data includes:

converting, based on intrinsic parameters and extrinsic parameters of the imaging device, the reference feature data to a current image coordinate system to obtain estimated feature data; and determining, based on an error between the estimated feature data and the feature data, the reprojection error.

8. The hand-eye calibration method according to claim 1, wherein the determining, based on the at least one image collected in the pose, a first transformation relationship between a first coordinate system of the calibration target and a second coordinate system of the imaging device in the pose includes:

the at least one image includes a plurality of images, a count of the plurality of images being greater than a threshold, for each image of the plurality of images, extracting feature data from each image;

determining, based on the feature data, an extrinsic parameter matrix of the imaging device corresponding to each image; and determining the first transformation relationship based on a plurality of extrinsic parameter matrices corresponding to the plurality of images.

9. The hand-eye calibration method according to claim 8, wherein the determining, based on the feature data, an extrinsic parameter matrix of the imaging device corresponding to each image includes:

performing a filtering operation on the feature data to obtain filtered feature data; and determining the extrinsic parameter matrix based on the filtered feature data.

10. The hand-eye calibration method according to claim 8, wherein the determining, based on the feature data, an extrinsic parameter matrix of the imaging device corresponding to each image includes:

determining, based on the feature data, a plurality of first extrinsic parameter matrices corresponding to the plurality of images; and performing a filtering operation on the plurality of first extrinsic parameter matrices to determine the plurality of extrinsic parameter matrices.

11. The hand-eye calibration method according to claim 8, wherein the determining, based on the feature data, an extrinsic parameter matrix of the imaging device corresponding to each image includes:

performing a filtering operation on the feature data to obtain filtered feature data;

determining, based on the filtered feature data, a plurality of second extrinsic parameter matrices corresponding to the plurality of the images; and performing a filtering operation on the plurality of second extrinsic parameter matrices to determine the plurality of extrinsic parameter matrices.

12. The hand-eye calibration method according to claim 1, wherein the determining, based on the first transformation relationships and the second transformation relationships corresponding to the different poses, a third transformation relationship between the second coordinate system and one of the third coordinate system and the fourth coordinate system includes:

constructing, based on the first transformation relationships and the second transformation relationships corresponding to the different poses, a plurality of sets of input data of a nonlinear optimization model, each set of input data corresponding to the first transformation relationship and the second transformation relationship corresponding to each pose of the different poses; and determining the third transformation relationship based on the nonlinear optimization model and the plurality of sets of input data.

13. The hand-eye calibration method according to claim 12, wherein each set of input data of the plurality of sets of input data includes a first relative transformation and a second relative transformation, the second relative transformation in each set of input data represents a position transformation of the second coordinate system in the pose corresponding to each set of input data relative to a reference pose, the first relative transformation in each set of input data represents a position transformation of the fourth coordinate system in the pose corresponding to each set of input data relative to the reference pose, the first relative transformation is constructed based on the second transformation relationship, and the second relative transformation is constructed based on the first transformation relationship.

14. A calibration target, comprising a target body, an infrared light emitting component, and an infrared light modulating component, wherein the infrared light emitting component is provided inside the target body;

the infrared light emitting component is configured to emit an infrared light to the target body, wherein different regions of the target body have different transmittances to the infrared light emitted by the infrared light emitting component; and the infrared light modulating component is configured to control the infrared light emitting component to emit an infrared light of at least one of a preset waveband or a preset intensity.

15. A hand-eye calibration system for a robot, comprising a calibration target, an imaging device, the robot, a processor, and a storage, wherein the storage is configured to store an instruction set, and the processor is configured to execute the instruction set to execute the hand-eye calibration method for the robot including:

obtaining images of a target body of the calibration target acquired by the imaging device when the robot is in different poses, the calibration target further including an infrared light emitting component and an infrared light modulating component, the infrared light emitting component being provided inside the target body, the infrared light emitting component being configured to emit an infrared light in an infrared light waveband that the imaging device is capable of collecting to the target body, different regions of the target body having different transmittances to the infrared light emitted by the infrared light emitting component, and the infrared light modulating component being configured to control the infrared light emitting component to emit an infrared light of at least one of a preset waveband or a preset intensity;

for any pose, determining, based on at least one image collected in the pose, a first transformation relationship, in the pose, between a first coordinate system of the calibration target and a second coordinate system of the imaging device;

obtaining a second transformation relationship between a third coordinate system and a fourth coordinate system of the robot; and determining, based on the first transformation relationships and the second transformation relationships corresponding to the different poses, a third transformation relationship between the second coordinate system and one of the third coordinate system and the fourth coordinate system, the third coordinate system being related to a base of the robot, and the fourth coordinate system being related to an end-of-arm tool (EOAT) of a robotic arm of the robot.

16. The hand-eye calibration system according to claim 15, wherein the obtaining images of a target body of a calibration target acquired by an imaging device when the robot is in different poses includes:

adjusting parameter information of at least one of the calibration target or the imaging device; and obtaining the at least one image collected in the pose by controlling the imaging device to perform imaging on the target body based on the adjusted parameter information.

17. The hand-eye calibration system according to claim 15, wherein the determining, based on the at least one image collected in the pose, a first transformation relationship between a first coordinate system of the calibration target and a second coordinate system of the imaging device in the pose includes:

the at least one image includes a plurality of images, a count of the plurality of images being greater than a threshold, for each image of the plurality of images, extracting feature data from each image;

determining, based on the feature data, an extrinsic parameter matrix of the imaging device corresponding to each image; and determining the first transformation relationship based on a plurality of extrinsic parameter matrices corresponding to the plurality of images.

18. The hand-eye calibration system according to claim 15, wherein the determining, based on the first transformation relationships and the second transformation relationships corresponding to the different poses, a third transformation relationship between the second coordinate system and one of the third coordinate system and the fourth coordinate system includes:

constructing, based on the first transformation relationships and the second transformation relationships corresponding to the different poses, a plurality of sets of input data of a nonlinear optimization model, each set of input data corresponding to the first transformation relationship and the second transformation relationship corresponding to each pose of the different poses; and determining the third transformation relationship based on the nonlinear optimization model and the plurality of sets of input data.

19. The hand-eye calibration system according to claim 17, wherein the determining, based on the feature data, an extrinsic parameter matrix of the imaging device corresponding to each image includes:

determining, based on the feature data, a plurality of first extrinsic parameter matrices corresponding to the plurality of images; and performing a filtering operation on the plurality of first extrinsic parameter matrices to determine the plurality of extrinsic parameter matrices.

20. The hand-eye calibration system according to claim 17, wherein the determining, based on the feature data, an extrinsic parameter matrix of the imaging device corresponding to each image includes:

performing a filtering operation on the feature data to obtain filtered feature data;

determining, based on the filtered feature data, a plurality of second extrinsic parameter matrices corresponding to the plurality of the images; and performing a filtering operation on the plurality of second extrinsic parameter matrices to determine the plurality of extrinsic parameter matrices.

* * * * *